(12) United States Patent
Dumler et al.

(10) Patent No.: US 11,680,895 B2
(45) Date of Patent: Jun. 20, 2023

(54) DEVICE FOR DETECTING WATER ON A SURFACE AND A METHOD FOR DETECTING WATER ON A SURFACE

(71) Applicant: Fraunhofer-Gesellschaft zur Foerderung der angewandten Forschung e.V., Munich (DE)

(72) Inventors: Dietrich Dumler, Munich (DE); Harald Gossner, Neubiberg (DE); Wolfgang Gerner, Neubiberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 4 days.

(21) Appl. No.: 17/199,078

(22) Filed: Mar. 11, 2021

(65) Prior Publication Data
US 2021/0285867 A1  Sep. 16, 2021

(30) Foreign Application Priority Data
Mar. 13, 2020  (DE) .......................... 102020203293.9

(51) Int. Cl.
*G01N 21/21* (2006.01)
*G01N 21/47* (2006.01)
(Continued)

(52) U.S. Cl.
CPC ....... *G01N 21/3554* (2013.01); *G01N 21/211* (2013.01); *G01N 21/359* (2013.01);
(Continued)

(58) Field of Classification Search
CPC .... G01N 21/211; G01N 21/359; G01N 21/47; G01N 2021/1738; G01N 2021/4709;
(Continued)

(56) References Cited

U.S. PATENT DOCUMENTS 5,218,206 A * 6/1993 Schmitt ............... B60R 16/0237
250/341.8
5,962,853 A 10/1999 Huth-fehre et al.
(Continued)

FOREIGN PATENT DOCUMENTS

DE 102013201741 A1 8/2014
EP 2336749 A1 6/2011
(Continued)

OTHER PUBLICATIONS

Casselgren, Johan, et al., "Road condition analysis using NIR illumination and compensating for surrounding light", Optics and Lasers in Engineering 77(2016) pp. 175-182, pp. 175-182.
(Continued)

*Primary Examiner* — Hina F Ayub
(74) *Attorney, Agent, or Firm* — Perkins Coie LLP; Michael A. Glenn

(57) ABSTRACT

A device for identifying water on a surface, including an optical sensor and a processor.
The optical sensor is configured to produce a first image of the surface which has a first optical bandwidth within which the water has a first absorption rate, and a second image of the surface which has a second optical bandwidth within which the water has a second absorption rate that is higher than the first absorption rate.
The processor is configured to combine the first image and the second image to produce a combined image in which the surface is reduced or eliminated as compared to the water. In addition, the processor is configured to detect water in the combined image.

21 Claims, 15 Drawing Sheets

(51) Int. Cl.

| | | |
|---|---|---|
| *G01N 21/359* | (2014.01) | |
| *G01N 21/3554* | (2014.01) | |
| *G06T 7/00* | (2017.01) | |
| *G06T 5/50* | (2006.01) | |
| *G06V 20/56* | (2022.01) | |
| *G01N 21/17* | (2006.01) | |

(52) U.S. Cl.
CPC .............. *G01N 21/47* (2013.01); *G06T 5/50* (2013.01); *G06T 7/0004* (2013.01); *G06V 20/56* (2022.01); *G01N 2021/1738* (2013.01); *G01N 2021/4709* (2013.01); *G06T 2207/20221* (2013.01); *G06T 2207/30256* (2013.01)

(58) Field of Classification Search
CPC ......... G06T 7/0002; G06T 2207/20221; G06T 2207/30261
See application file for complete search history.

(56) References Cited

U.S. PATENT DOCUMENTS

| 2014/0049405 | A1 | 2/2014 | Breuer et al. | |
|---|---|---|---|---|
| 2014/0050355 | A1* | 2/2014 | Cobb | .................... G06V 20/41 |
| | | | | 382/103 |
| 2017/0124402 | A1 | 5/2017 | Tanaka et al. | |
| 2017/0293812 | A1 | 10/2017 | Itoh et al. | |

FOREIGN PATENT DOCUMENTS

| JP | S59188545 | A | 10/1984 |
|---|---|---|---|
| JP | 2009257919 | A | 11/2009 |
| JP | 2013148505 | A | 8/2013 |
| JP | 2018025528 | A | 2/2018 |
| JP | 2018128265 | A | 8/2018 |
| WO | 2014118337 | A1 | 8/2014 |

OTHER PUBLICATIONS

Colace, L, et al., "A near-infrared optoelectronic approach to detection of road conditions", Optics and Lasers in Engineering 51 (2013) 633-636, pp. 633-636.

Gregoris, Dennis, et al., "Multispectral imaging of ice", 4. 2051-2056 vol. 4, pp. 2051-2056.

Kim, Jisu, et al., "Wet area and puddle detection for Advanced Driver Assistance Systems (ADAS) using a stereo camera", International Journal of Control, Automation and Systems. 14. 263-271, pp. 263-271.

Piccardi, Armando, et al., "Optical Detection of Dangerous Road Condition", Sensors 2019, 19, 1360; doi:10.3390/s19061360, pp. 283-288.

Riehm, Mats, et al., "Ice formation detection on road surfaces using infrared thermometry", Cold Regions Science and Technology, s 83-84. 71-76, pp. 71-76.

Abdel-Moati, Hazem, et al., "Near field ice detection using infrared based optical imaging technology", Optics and Laser Technology 99 (2018): 402-410., pp. 402-410.

Achar, Supreeth, et al., "Self-supervised segmentation of river scenes", IEEE International Conference on Robotics and Automation · May 2011, 6227-6232, pp. 6227-6232.

Gailius, Darius, et al., "Ice detection on a road by analyzing tire to road friction ultrasonic noise", ISSN 1392-2114 Ultragarsas (Ultrasound), vol. 62, No. 2, 2007., pp. 17-20.

Maček, Kristijan, et al., "A Lane Detection Vision Module for Driver Assistance", Jan. 24, 2014, 7 pp.

Matthies, Larry, et al., "Detecting water hazards for autonomous off-road navigation", 2003, pp. 231-242.

Nakauch, Shigeki, et al., "Selection of optimal combinations of band-pass filters for ice detection by hyperspectral imaging", Optics Express, vol. 20, No. 2 Jan. 16, 2012, 986-1000, pp. 986-1000.

Nguyen, Chuong V, et al., "3D tracking of water hazards with polarized stereo cameras", 2017 IEEE International Conference on Robotics and Automation (ICRA) Singapore, May 29-Jun. 3, 2017, May 29, 2017, 8 pp.

Rankin, Arturo L, et al., "Daytime water detection based on sky reflections", Robotics and Automation (ICRA) 2011 IEEE International Conference on. IEEE, 2011, pp. 5329-5336, Jun. 2011, pp. 5329-5336.

Troiano, Amedeo, et al., "New System for Detecting Road Ice Formation. Instrumentation and Measurement", IEEE Transactions on Instrumentation and Measurement, vol. 60 n. 3, pp. 1091-1101.—ISSN 0018-9456, pp. 1091-1101.

Viikari, Ville V, et al., "Road-condition recognition using 24-GHz automotive radar", IEEE Transactions on Intelligent Transportation Systems, vol. 10, No. 4, pp. 639-648, 2009, Dec. 2009, pp. 639-648.

Xie, Bin, et al., "Polarization-Based Water Hazards Detection for Autonomous Off-road Navigation", Proceedings of the 2007 IEEE International Conference on Mechatronics and Automation, ICMA 2007. 3186-3190., pp. 3186-3190.

Nakayama, Yasunori, "2. 1 Space Filtering (vol. 1, Chapter 4) in "Application and Analysis Technology of Remote Sensing", First edition, First printing, Aug. 8, 2019, pp. 31-32, ISBN: 978-4-86043-612-4 (Publication showing well-known technology; Newly cited publication) [No. English version available.].

* cited by examiner

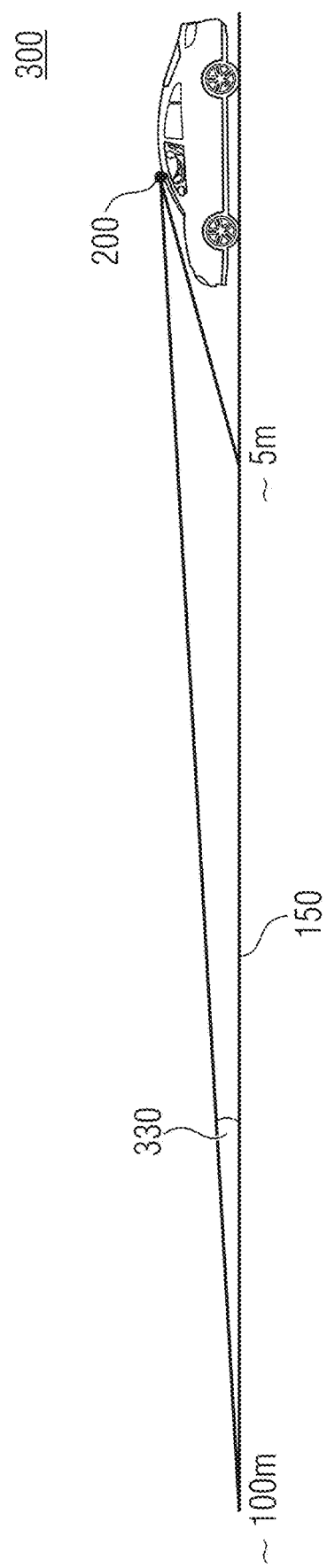

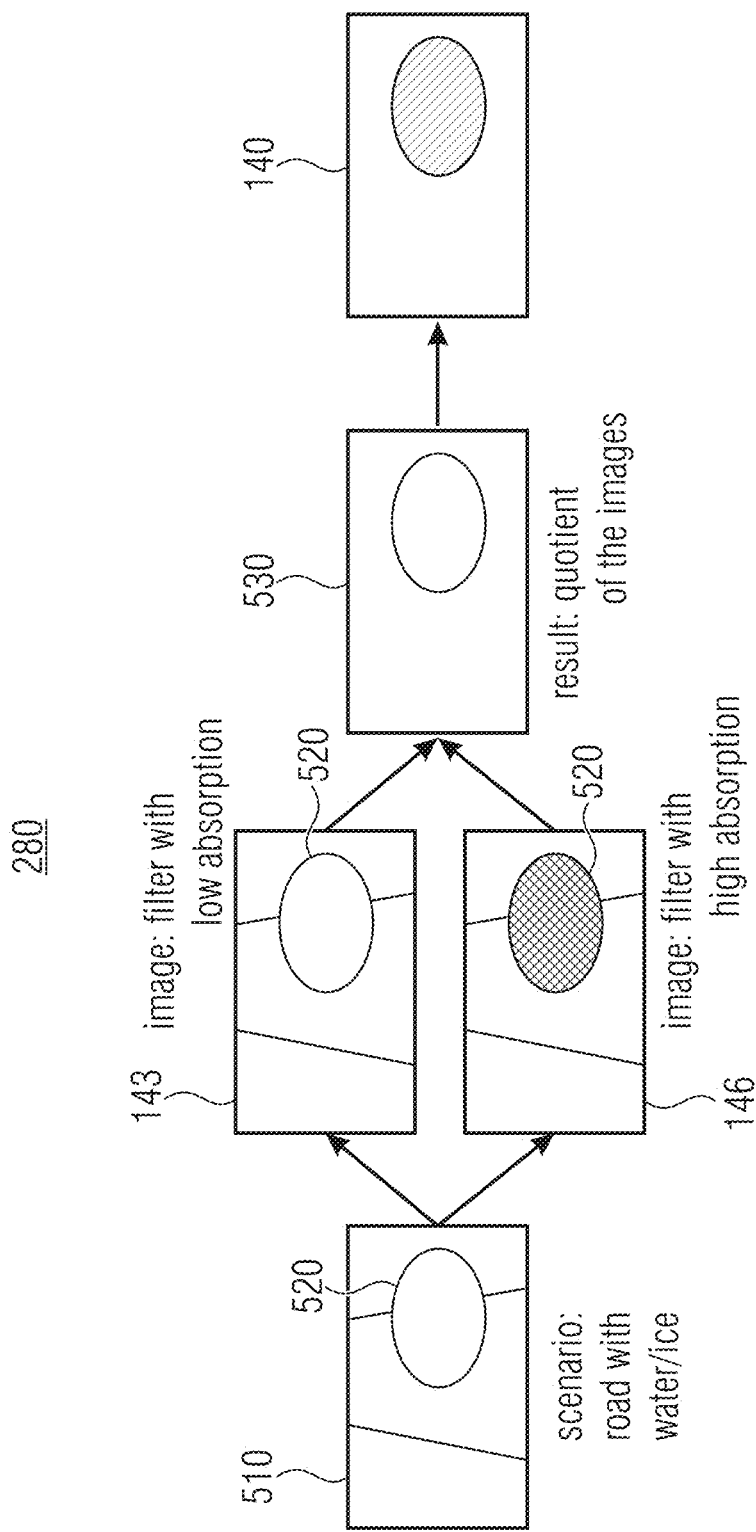

DEVICE FOR DETECTING WATER ON A SURFACE AND A METHOD FOR DETECTING WATER ON A SURFACE

CROSS-REFERENCE TO RELATED APPLICATION

This application claims priority from German Patent Application No. DE 102020203293.9, which was filed on Mar. 13, 2020, and is incorporated herein in its entirety by reference.

The present application relates to a device for identifying water on a surface, and to a method of identifying water on a surface.

BACKGROUND OF THE INVENTION

Identification of road conditions is essential for safe driving. Modern cars estimate general risks of road conditions with the help of temperature and control sensors. Several principles for active identification of accumulation of water on the road while using different main features and results are proposed.

On an RGB picture, it is difficult to distinguish a wet spot from a dirty spot, for example, since both are simply darker. Although water is transparent, water is easily visible in RGB pictures due to several effects that change the path of the light ray. Computer vision algorithms or object detection algorithms may be applied to RGB pictures to locate anomalies on the road such as, e.g., puddles of water. The advantages of this reflection method include the fact that common image sensors may be used, making this method a low-cost solution, and that localization and classification are possible. While using an RGB camera, the various effects such as polarization and absorption cannot be determined, and therefore, the results of the localization and classification method are highly dependent on the respective case and are unreliable.

Another method describes measuring the backscatter characteristics of the surface. The backscatter behavior of a surface is highly dependent on its roughness. Water and ice are smoother than ordinary road materials such as asphalt. A large portion of the horizontally polarized part of the light rays is reflected by the water or ice surface, while the vertical part of the light rays penetrates the water surface and is scattered on the ground and/or on ice crystals. Using polarization filters to measure these backscattering properties of the environment provides reference points for a classification assessment. Measuring backscattering properties is a cheap solution as it allows using common image sensors comprising simple polarization filters. In addition, this solution makes it possible to reliably locate smooth areas such as water and ice, for example. However, distinguishing between water and ice is possible only with a known light source or with a polarized light source. Yet this method is susceptible to external influences such as extraneous light and/or variations in the subsurface.

The next method presented is spectral absorption measurement of water. Water has a recognizable absorption characteristic and absorbs much more energy within the infrared spectrum than within the range of visible light. Within the near infrared (NIR) range, water shows distinct absorption peaks. Some of these absorption peaks exhibit a significant shift when the water begins to form crystals or to freeze. Using specific image sensors such as those based on specific semiconductors from the III-V group, for example, for increased spectral sensitivity allows these peaks within the NIR range to be measured, providing a simple method for distinguishing between water, ice, and snow. An advantage of this method is, e.g., reliable classification, e.g. between water, ice, snow and dry soil. Disadvantages of this solution are, e.g., expensive hardware, low resolution and poor localization.

SUMMARY

According to an embodiment, a device for identifying water on a surface may have: an optical sensor for producing a first image of the surface which has a first optical bandwidth within which the water has a first absorption rate, and a second image of the surface which has a second optical bandwidth within which the water has a second absorption rate that is higher than the first absorption rate; a processor for combining the first image and the second image to produce a combined image in which the surface is reduced or eliminated as compared to the water, and for detecting the water in the combined image; and an additional optical sensor configured to provide to the processor a third image with a first polarization filter having a first polarization angle, and to provide to the processor a fourth image with a second polarization filter having a second polarization angle, wherein the two polarization filters differ from each other with regard to their polarization angles, and wherein the processor is configured to detect an aggregate state of the water while using the third image and the fourth image in the combined image.

According to another embodiment, a means of locomotion may have: the inventive device for identifying water on a surface, and an interface, wherein the interface is configured to alert a driver of the means of locomotion and/or to influence control of the means of locomotion if the device detects a solid state of the water.

According to yet another embodiment, a method of distinguishing a liquid or solid aggregate state of water in a region containing water may have the steps of: obtaining a first image of the surface which has a first optical bandwidth within which the water has a first absorption rate, obtaining a second image of the surface which has a second optical bandwidth within which the water has a second absorption rate that is higher than the first absorption rate, combining the first image and the second image to obtain a combined image in which the surface is reduced or eliminated as compared to the water, detecting the water in the combined image, obtaining a third image with a first polarization filter having a first polarization angle, obtaining a fourth image with a second polarization filter having a second polarization angle, wherein the two polarization filters differ from each other with regard to their polarization angles, evaluating the picture elements of the regions containing water of the third and fourth images, and detecting the aggregate state of the water on the basis of the evaluation of the picture elements.

According to still another embodiment, a non-transitory digital storage medium may have a computer program stored thereon to perform the inventive method, when said computer program is run by a computer.

Embodiments of the invention provide a device for identifying water on a surface which comprises an optical sensor and a processor.

The optical sensor is configured to provide a first image of the surface which has a first optical bandwidth within which the water has a first absorption rate, and a second image of the surface which has a second optical bandwidth within which the water has a second absorption rate that is higher than the first absorption rate.

The processor is configured to combine the first image and the second image to produce a combined image in which the surface is reduced or eliminated as compared to the water.

In addition, the processor is configured to detect water in the combined image.

Examples of the present invention are based on the finding that relative measurements are preferred over absolute measurements so as to reduce the effects of external influencing factors such as the environment and/or lighting, for example, on the measurement of physical properties. In this case, a physical parameter, e.g., absorption, is extracted from several measurements performed, e.g., by using several optical filters.

Thus, the device provides reliable identification of water on the surface.

To take advantage of the absorption characteristics of water, the device takes two pictures of the same surface by using an optical sensor comprising bandpass filters for the spectral ranges having high and low water absorption rates, respectively.

Other materials exhibit constant absorption rates within the specific spectral range, only water will produce differences. External influencing factors such as changes in the subsurface or illumination will influence both pictures equally.

To reduce or eliminate background, in embodiments the processor is configured to combine the images pixel by pixel to provide a combined image. The combined image is a type of water heat map, the pixels showing a positive probability of water or ice. This may also be referred to as "confidence".

Subsequently, detection of the water in the resulting combined image will still take place. For example, water is detected while using a threshold, where pixels having a certain intensity above the threshold are identified as water.

The device is configured to detect liquid or solid water on a surface such as a road, for example.

In embodiments, the first optical bandwidth is selected from a spectral range between 400 nm and 900 nm, and the second optical bandwidth is selected from a spectral range between 900 nm and 1200 nm. CMOS sensors or silicon-based image sensors are sensitive up to ~1000 nm, or theoretically up to ~1102 nm. The relatively broad spectral range between ~900 nm and ~1000 nm is advantageous.

All aggregate states of water exhibit an increased absorption rate within the spectral range between 900 nm and 1200 nm as compared to the spectral range between 400 nm and 900 nm, whereas the absorption rate of common road materials such as asphalt remains negligible within the entire spectral range between 400 nm and 1200 nm as compared to the absorption peak of water, which is at ~980 nm.

An aforementioned selection of the first optical bandwidth and the second optical bandwidth provides a difference in pixel intensities in regions comprising water between the pictures.

In embodiments, the first optical bandwidth has a value ranging between 820 nm and 870 nm, 840 nm and 880 nm, or 850 nm and 890 nm at a half-width, and the second optical bandwidth has a value ranging between 920 nm and 970 nm, 940 nm and 980 nm, or 950 nm and 990 nm at the half-width.

Optimum selection of the first optical bandwidth and of the second optical bandwidth provides a maximally possible difference in pixel intensities in regions comprising water between the pictures.

In embodiments, the optical sensor has a vertical polarization filter configured to reduce or eliminate the horizontally polarized light rays.

As long as the incident angle of the rays reflected off the water surface is close to the Brewster angle, the rays reflected off the water surface are mainly horizontally polarized, and the rays penetrating the water are mainly vertically polarized. The rays that do not penetrate the water are not affected by the absorption of the water. A vertical polarization filter removes or eliminates the horizontally polarized rays. Since in the vicinity of the Brewster angle, most of the horizontally polarized light undergoes specular reflection, a vertical polarization filter may be used to remove specular reflection.

In embodiments, the optical sensor comprises a monochrome sensor or a CMOS sensor or a low-cost silicon sensor. These properties are not mutually exclusive. Monochromatic sensors comprise no filter layer or a filter layer that covers the entire area. Monochrome sensors are used when filters are externally mounted. As soon as the filters are applied in the form of different coatings, the sensor is no longer monochrome.

Common, inexpensive, silicon-based image sensors are referred to as CMOS sensors. In fact, CMOS is only one type of design. In embodiments, all types of design, such as CMOS or CCD, may be used. However, there are also expensive CMOS sensors that are based on III-V semimetals. In embodiments, low-cost silicon sensors are used, which have lower sensitivity than the more expensive type. Specific III-V semiconductor sensors, which are sensitive within higher wavelength ranges >1100 nm, are not necessary.

Examples of the present invention feature low-cost common CMOS image sensors or less complex monochrome image sensors without Bayer filters.

In embodiments, the optical sensor comprises a first individual sensor comprising a first optical bandpass filter having the first bandwidth, and a second individual sensor comprising a second optical bandpass filter having the second bandwidth, the optical sensor being configured to produce the first image by means of the first individual sensor and the second image by means of the second individual sensor simultaneously.

In further embodiments, the optical sensor comprises a third individual sensor having exchangeable optical bandpass filters, the exchangeable optical bandpass filters comprising the first optical bandpass filter having the first bandwidth and the second optical bandpass filter having the second bandwidth, the optical sensor being configured to produce, in succession, the first image by means of the third individual sensor comprising the first optical bandpass filter and the second image by means of the third individual sensor comprising the second optical bandpass filter.

In embodiments, the optical sensor comprises a fourth individual sensor comprising a filter layer, the filter layer being configured to divide pixels of the image produced by the fourth individual sensor into two groups in a row-wise, column-wise, or checkerboard-wise manner, wherein the first optical bandpass filter having the first bandwidth is arranged above the pixels of the first group so that the pixels of the first group produce the first image having the first optical bandwidth, and the second optical bandpass filter having the second bandwidth is arranged above the pixels of the second group so that the pixels of the second group produce the second image having the second optical bandwidth.

The optical sensor of the device is configured to provide the first image having the first bandwidth and the second image having the second bandwidth as simultaneously as possible, so that, as far as possible, the same surface is imaged in the first image and in the second image. In embodiments, these requirements are met by several individual sensors comprising several bandpass filters, by an individual sensor comprising exchangeable optical bandpass filters, or by an individual sensor comprising a filter layer.

In embodiments, the processor is configured to use to use, in combining the first image and the second image, pixel-by-pixel quotient calculation, pixel-by-pixel difference calculation, pixel-by-pixel normalized difference calculation, or difference calculation between 1 and quotient calculation.

The processor of the device is configured to combine the pictures on a pixel-by-pixel basis while using any of the calculations described above to produce a combined image. The combined image is a type of water heat map. Each pixel of the combined image represents a positive probability value for water or ice in that pixel. This may also be referred to as "confidence". In the case of a simple quotient, it may conversely represent the confidence of the dry surface in a pixel.

In alternative embodiments, individual pictures are no longer actively combined, but raw data is passed directly to a trained model that makes decisions on the basis of the raw data.

In embodiments, the processor is configured to provide a folded image. The processor is configured to scan the combined image with pixels on a pixel-by-pixel basis or on a block-by-block basis by using a pixel window, to compute a weighted average of the values of the pixels of the pixel window, and to create a folded image from the weighted averages, wherein positions of the weighted averages in the folded image correspond to positions of the pixel windows in the combined image. This step increases the signal-to-noise ratio (SNR), where the signal is an absorption difference and the noise includes all residuals.

A water absorption rate is about $$2.0 \cdot 10^{-3} \frac{1}{mm}.$$

This means that for a water film having a depth of 1 mm and a pixel saturation of 255, only $2.0 \cdot 10^{-3} \cdot 255 = 0.51$ at best will be absorbed.

For the absorption effect to become measurable at all, the adjacent pixels are also incorporated in a pixel window. The larger the pixel window, the more the absorption effect will be amplified and, accordingly, the resulting folded image or water heat map also becomes blurrier. For example, if a puddle consists of only a single pixel or of too few pixels, it will not be identified.

In embodiments, the processor is configured to compare values of individual pixels of the combined image or of a folded image derived from the combined image to a threshold. The pixels having values that exhibit a certain relationship to the threshold are detected as water. A threshold decision is one of the simplest solutions for water detection. E.g., a better result may be achieved by a "feature detection".

The combined image or the folded image is a kind of water heat map, where the pixels represent a probability of the appearance of water or ice.

During localization or identification of water, values of the combined image are compared to a threshold pixel by pixel. That is, a final decision may be made with a threshold on a pixel-by-pixel basis or even via "feature extraction," i.e., identification of contiguous areas while using a neural network, for example.

In embodiments, the device comprises an additional sensor configured to provide information to the processor. The processor is configured to detect an aggregate state of the water while using the information in the combined image.

The device comprising an additional sensor enables preventive localization and identification of wet areas, puddles, and ice or snow formations to deduce the actual danger or risk of traction loss, which is a key feature for safe driving and future advanced driver assistance systems (ADAS) or autonomous driving vehicles. Preventive hazard detection of just 0.5 seconds before actual traction loss may enable an ADAS to prevent a driver from making a wrong decision to panic or to preemptively deploy an airbag, thus preventing fatal injuries.

Absorption measuring alone cannot detect snow and cloudy ice. For this, the backscattering method provides localization, and the absorption measurements are used as a confirmation. Thus, the sensor provides more than just aggregate-state information.

In embodiments, the additional sensor comprises an additional optical sensor. The additional optical sensor is configured to provide a third image with a first polarization filter having a first polarization angle and a fourth image with a second polarization filter having a second polarization angle, the two polarization filters differing from each other with regard to their polarization angles. Furthermore, the additional optical sensor is configured to provide the third and fourth images to the processor.

A combination of the absorption and backscattering measurements provides reliable features to assess the presence of water or ice on a pixel-by-pixel basis.

Analysis of the polarization characteristics of the reflection of liquid water shows a high polarization ratio of light with a predominantly horizontal orientation, while the ice crystals scatter the light ray and cause rotation of the wave. Ice crystals yield a more scattered polarization with a slightly shifted orientation.

The differences in polarization properties make it possible to implement a distinction between water and ice.

The different polarization planes of the images allow extracting the backscattering properties, namely the phase, major axis and minor axis of a polarization ellipse. The angular offset of the polarization planes is not relevant here and may be chosen arbitrarily.

In embodiments, the additional optical sensor has an individual sensor comprising a polarization filter layer.

The polarization filter layer is configured to divide picture elements of the picture produced by the individual sensor into two groups in a row-by-row, column-by-column or checkerboard manner. Above the picture elements of the first group, the first polarization filter is arranged so that the picture elements of the first group produce the third image with the first polarization angle. The second polarization filter is arranged above the picture elements of the second group, so that the picture elements of the second group produce the fourth image with the second polarization angle.

The additional optical sensor comprising the polarization filter layer is configured to produce the third image with the first polarization filter and the fourth image with the second polarization filter as simultaneously as possible, so that, as far as possible, the same surface is imaged in the pictures.

In embodiments, the polarization angles of the polarization filters are arranged to be offset from one other by 90°. Two polarization filters having polarization angles of 0° and 90° are sufficient. Three polarization filters having polarization angles offset from one another by 60° provide higher accuracy.

Uniform distribution of the polarization plane allows the major and minor axes of a polarization ellipse to be extracted in detail, thus making it easier to distinguish between water and ice.

In embodiments, the processor is configured to detect regions comprising water in the combined image or in a folded image derived from the combined image. Furthermore, the processor is configured to evaluate picture elements from the third and fourth images in the regions comprising water, and to detect an aggregate state of the water, i.e., whether the regions comprising water comprise water, liquid water, or ice.

A combination of the absorption and backscattering measurements provides reliable features to assess the presence of water or ice on a pixel-by-pixel basis. Regions comprising water are detected by an absorption measurement, and the aggregate states of the water in the areas are assessed by using backscattering measurements.

In embodiments, the processor is configured to generate normalized intensity values of the third and fourth images when evaluating the picture elements of the third and fourth images.

Moreover, the processor is configured, when generating normalized intensity values, to use a comparison of the values of the picture elements with a sum of the values of the picture elements of the third and fourth images so as to detect the aggregate state of the water.

The processor is configured to detect an aggregate state of the water as being ice when the normalized intensity values of the third and fourth images are within a range comprising +/−10% of the mean value of the normalized intensity values of the third and fourth images, or to detect the aggregate state of the water as being liquid water when a normalized intensity value from the normalized intensity values of the third and fourth images is greater than 1.5 times the mean value of the normalized intensity values of the third and fourth pictures.

The three images are normalized, on a pixel-by-pixel basis, to the mean value of the three images and are compared to one another. The simple threshold decision that can be automated may be summarized as follows.

The ice surfaces exhibit large scattering and, thus, the picture elements of all three images will have similar normalized intensity values. If the picture elements of all three images have similar normalized intensity values in the same area, then picture elements of the area will be identified as being ice.

Reflection of liquid water shows a high polarization ratio of light with predominantly horizontal orientation. If the normalized intensities in one area of an image are much higher than the intensities of the other images in the same area, picture elements of the area will be identified as being water.

In embodiments, the device includes a temperature sensor configured to provide an ambient temperature value to the processor, which allows the processor to evaluate an aggregate state of the water.

An additional temperature sensor allows further complexities to be reduced. If the ambient temperature is far above or far below the freezing point of the water, the region comprising water will be identified as being water or ice, depending on the ambient temperature.

In embodiments, the processor is configured to sense a set of state values comprising information from the first image and the second image, and to provide a variable threshold as a function of the set while using an artificial-intelligence element or a neural network. A neural network may be used to find a better threshold on a pixel-by-pixel basis or to identify contiguous shapes in the complete picture, as a variant of "feature detection".

In addition, the processor is configured to detect water in the combined image or an aggregate state of water in the combined image while using the variable threshold.

The variable threshold, which was created as a function of the information from the first image and from the second image while using an artificial-intelligence element or a neural network, will yield a better identification rate in different environmental situations.

In embodiments, the processor is configured to sense a set of state values comprising information from the third image and from the fourth image, and to provide a variable threshold as a function of the set while using an artificial-intelligence element or a neural network.

In addition, the processor is configured to detect water in the combined image or an aggregate state of water in the combined image while using the variable threshold.

The variable threshold, which was created as a function of the information from the third image and from the fourth image while using an artificial-intelligence element or a neural network, will yield a better identification rate in different environmental situations.

Embodiments of the invention provide a means of locomotion comprising the device and an interface.

The device includes an additional sensor configured to provide information to the processor.

The processor of the device is configured to detect an aggregate state of water while using the information in the combined image.

The interface is configured to alert a driver of the means of locomotion and/or to influence control of the means of locomotion if the device detects a solid state of the water.

The device of the means of locomotion enables safe driving by preventive localization and identification of wet areas, puddles, and ice or snow formations to deduce the actual danger or risk of traction loss. Preventive hazard detection prior to actual traction loss may enable an ADAS to alert the driver or influence control of the means of locomotion via the interface.

Further embodiments according to the present invention provide corresponding methods.

Embodiments according to the present invention will exhibit preventive identification of water and ice hazards on the road while using CMOS image sensors.

With regard to the schematic figures shown, it shall be pointed out that functional blocks shown are to be understood both as elements or features of an inventive device and as corresponding method steps of an inventive method, and that corresponding method steps of the inventive method may also be derived therefrom.

BRIEF DESCRIPTION OF THE DRAWINGS

Embodiments of the present invention will be detailed subsequently referring to the appended drawings, in which:

FIG. 3b shows a schematic representation of an embodiment of a means of locomotion comprising the device;

FIG. 5 shows a schematic representation of an evaluation method of the absorption measurement performed by the processor of the device;

Figure 8A:
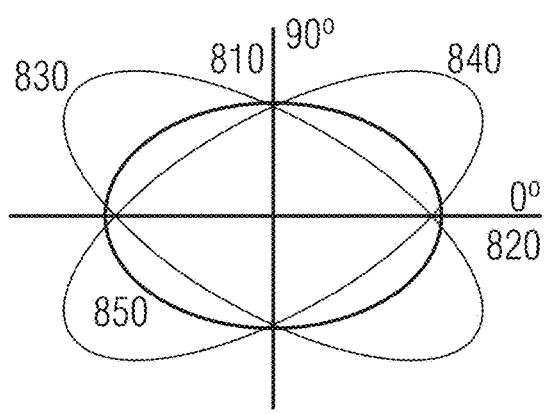
Figure 8B:
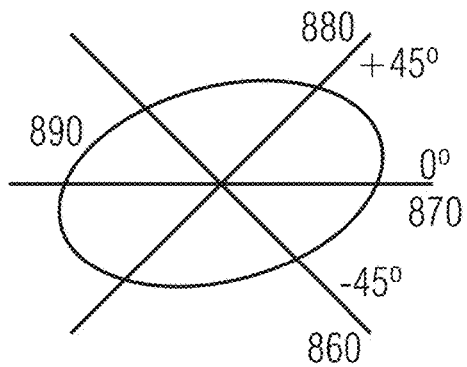
Figure 8C:
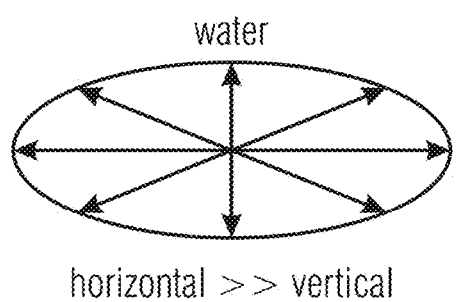
Figure 8D:
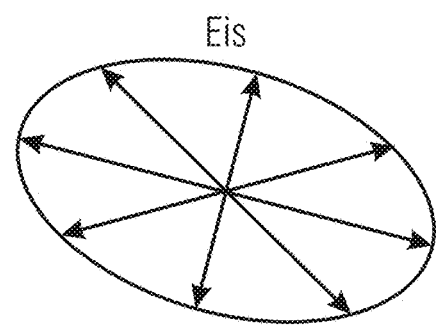
Figure 8E:
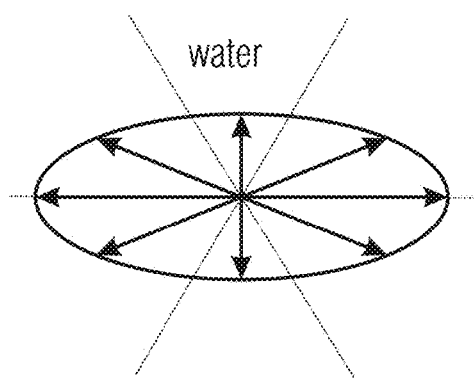
Figure 8F:
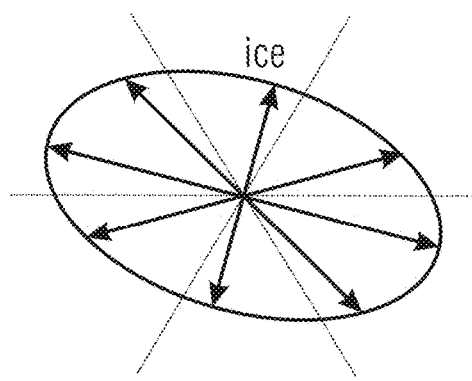
Figure 9A:
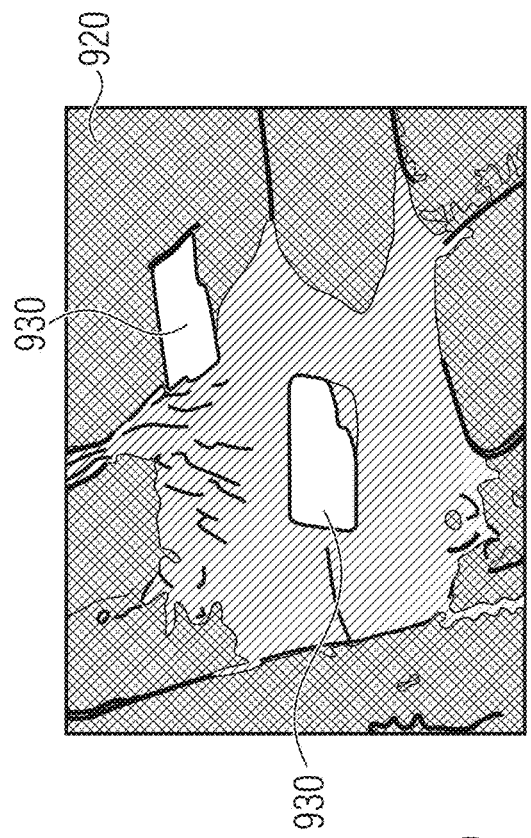
Figure 9B:
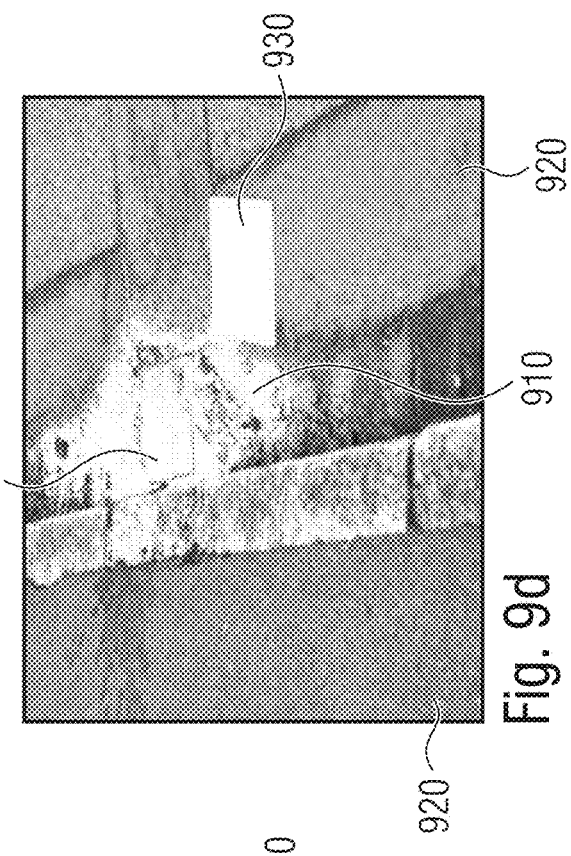
Figure 9C:
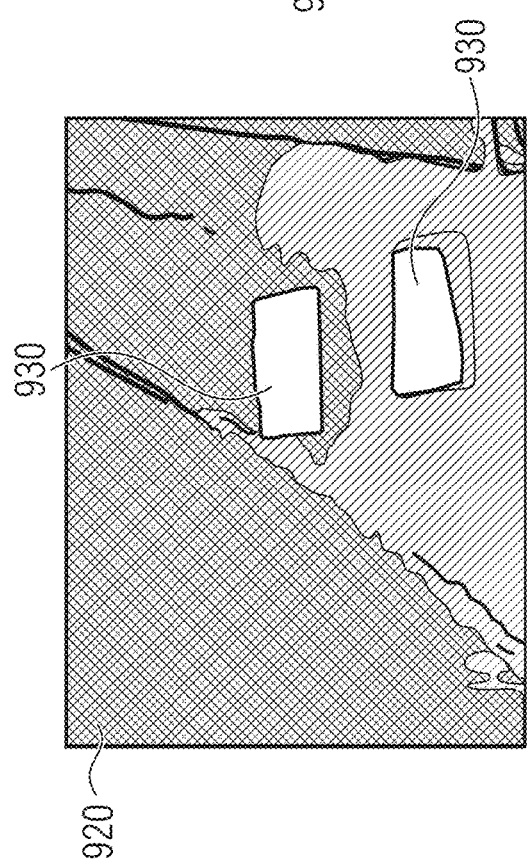
Figure 9D:
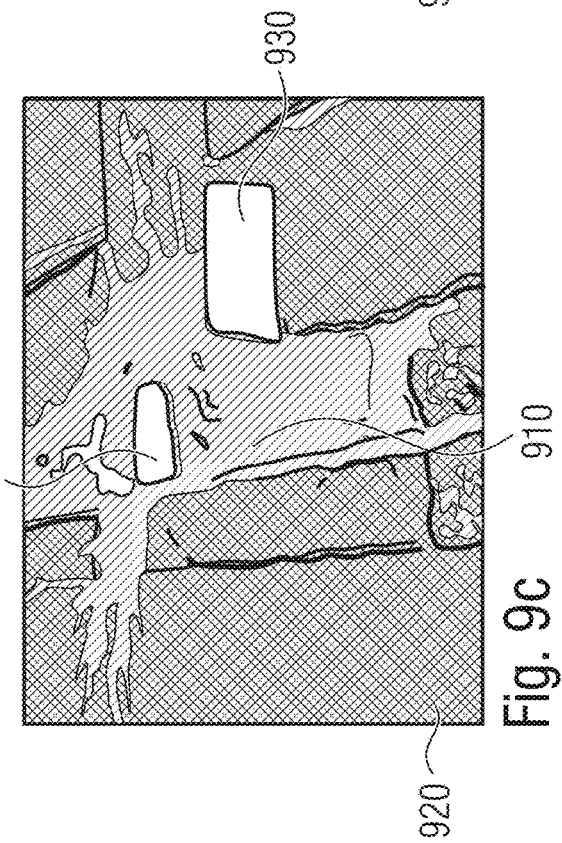
Figure 10:
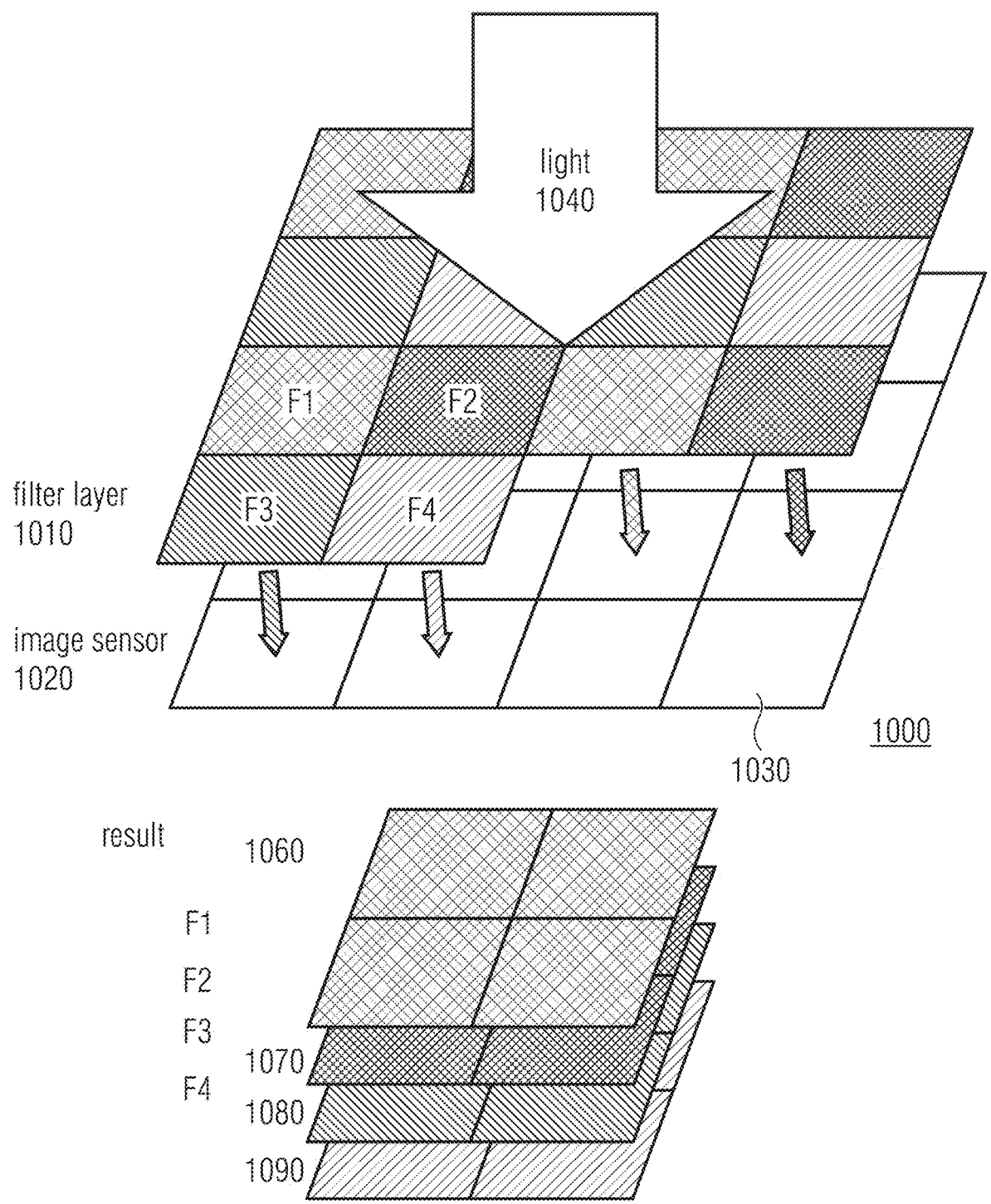
Figure 11:
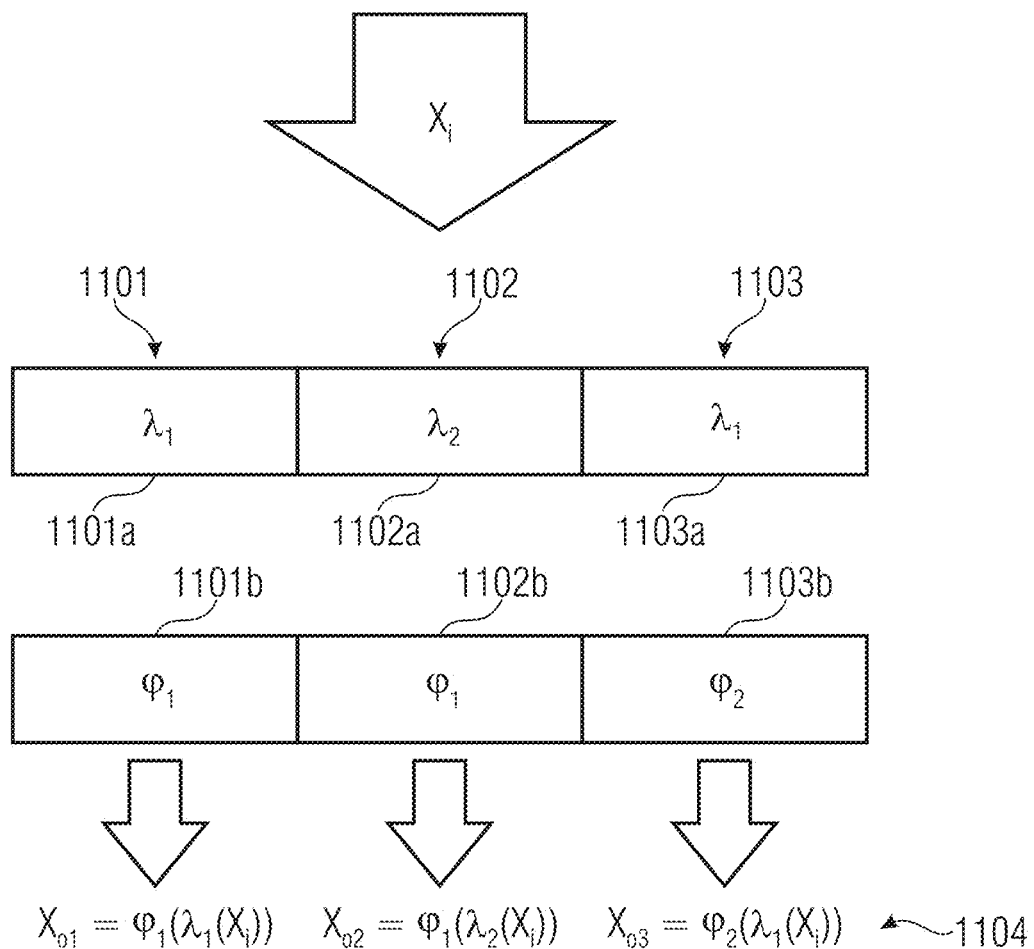

of the light rays which are polarized vertically and in parallel and are reflected off the water surface at different incident angles;

FIG. 8a shows three possible polarization ellipses defined by two polarization planes;

FIG. 8b shows a polarization ellipse defined by three polarization planes;

FIG. 8c shows a polarization ellipse of liquid water with a large horizontally polarized portion;

FIG. 8d shows a polarization ellipse of solid water with uniform polarization fractions;

FIG. 8e shows a polarization ellipse of liquid water with no change in orientation;

FIG. 8f shows a polarization ellipse of solid water with a change in orientation;

FIG. 9a shows an image with a first polarization filter over a surface with water;

FIG. 9b shows an image with a second polarization filter over a surface with water;

FIG. 9c shows an image with a third polarization filter over a surface with water;

FIG. 9d shows an image without a filter over a surface with water;

FIG. 10 shows an optical sensor comprising an image sensor and a filter layer; and FIG. 11 shows an implementation involving three different cameras, or light-sensitive areas.

DETAILED DESCRIPTION OF THE INVENTION

Before embodiments of the present invention will be explained in detail below with reference to the drawings, it shall be pointed out that identical elements, objects and/or structures having the same function or the same effect are provided with the same or similar reference numerals in the different figures, so that the descriptions of these elements which are given in the different embodiments are interchangeable, or mutually applicable.

Figure 1:
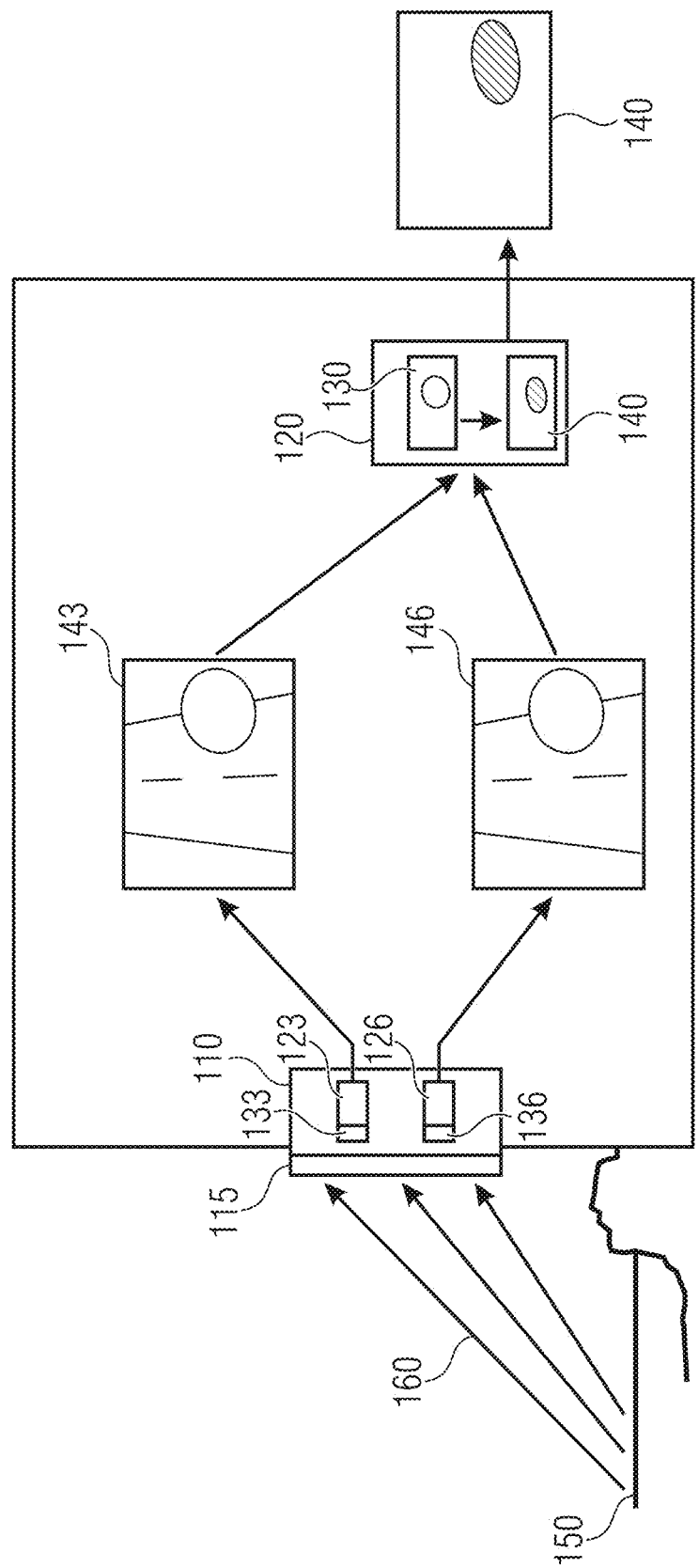
FIG. 1 shows a schematic representation of an embodiment of a device comprising an optical sensor and a processor.

FIG. 1 shows a schematic representation of an embodiment of a device 100 for identifying water on a surface 150, comprising an optical sensor 110 and a processor 120 coupled to the optical sensor. The output of the processor 120 is the output of the device 100.

The optical sensor 110 includes a vertical polarization filter 115, a first individual sensor 123 comprising a first optical bandpass filter 133 and a second individual sensor 126 comprising a second optical bandpass filter 136. The vertical polarization filter 115 is not required.

The first optical bandpass filter has a first bandwidth within which the water has a first absorption rate. The second optical bandpass filter has a second bandwidth within which the water has a second absorption rate that is higher than the first absorption rate.

The device is configured to detect water on the surface 150. Light rays 160, as will be discussed further below, partially penetrate the water and are partially reflected off the water surface.

The vertical polarization filter 115 is configured to reduce or eliminate the horizontally polarized rays that are reflected off the water surface in a specular manner.

The non-reduced rays will arrive at either the first individual sensor 123 comprising the first optical bandpass filter 133 or at the second individual sensor 126 comprising the second optical bandpass filter 136.

The optical sensor 110 is configured to produce a first image 143 by means of the first individual sensor 123 and a second image 146 by means of the second individual sensor as simultaneously as possible, so that, as far as possible, the same surface 150 is imaged in the first image and in the second image. Furthermore, the sensor is configured to provide the first image and the second image to the processor.

The processor is configured to provide a combined image 130 as a combination of the first image and the second image, and to detect or locate water in the combined image, as will be discussed further below. The detected regions comprising water 140 are the outputs of the processor or the outputs of the device.

Figure 2:
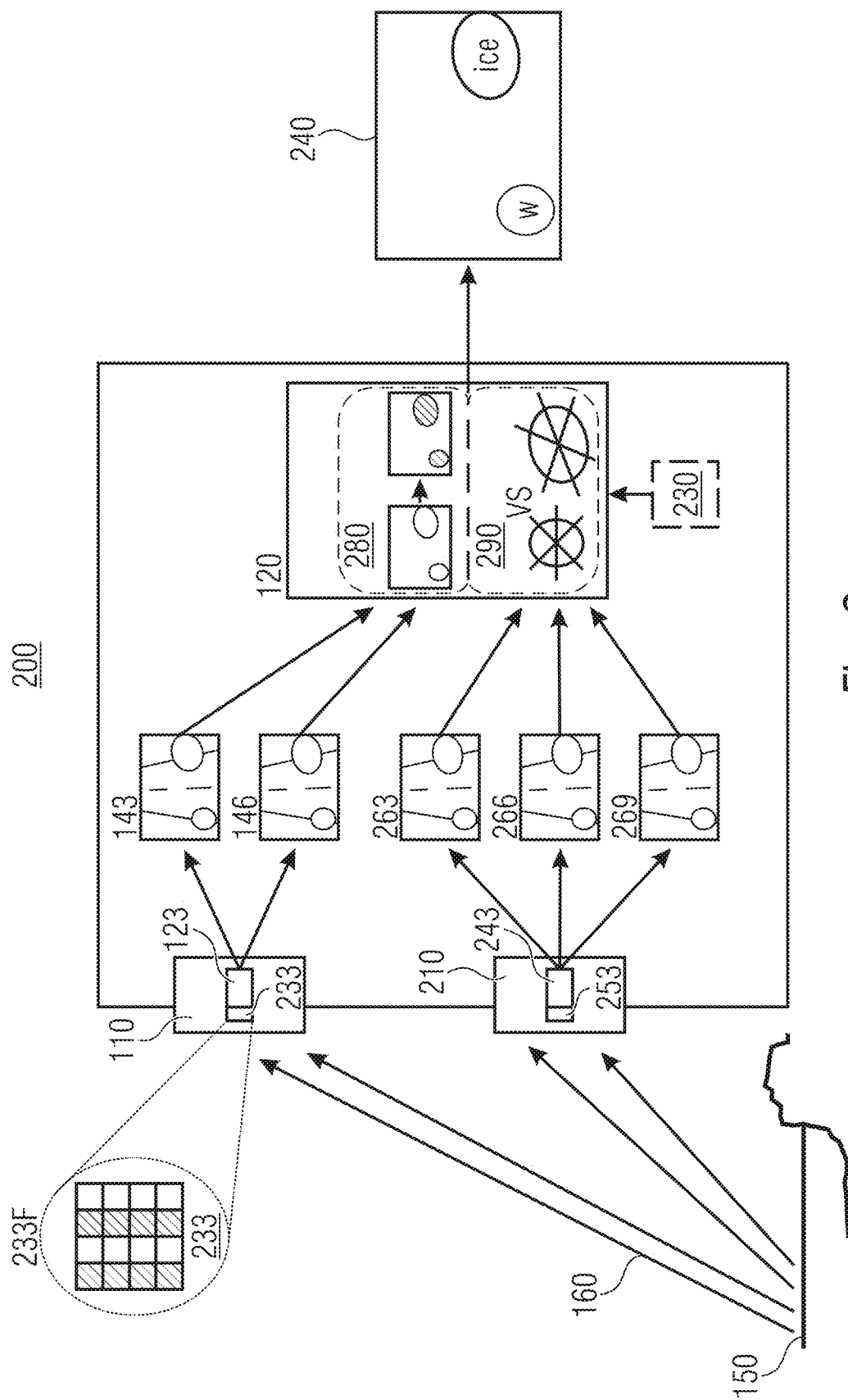
FIG. 2 shows a schematic representation of an embodiment of a device comprising an optical sensor, an additional optical sensor and a processor.

FIG. 2 shows a schematic representation of an embodiment of a device 200 for identifying an aggregate state of the water on a surface 150 by means of an optical sensor 110, an additional optical sensor 210, and a processor 120 coupled to the optical sensor 110 and to the additional optical sensor 210. The output of the processor 120 is the output of the device 200.

The processor may be coupled to an optional additional temperature sensor 230.

The optical sensor 110 includes an individual sensor 123 comprising a filter layer 233. As indicated in frontal view 233F, the filter layer is divided into two groups in a row-by-row, column-by-column, or checkerboard manner. The first optical bandpass filter having the first bandwidth is located in the first group, and the second optical bandpass filter having the second bandwidth is located in the second group.

The first optical bandpass filter has a first bandwidth within which the water has a first absorption rate, and the second optical bandpass filter has a second bandwidth within which the water has a second absorption rate that is higher than the first absorption rate.

The additional optical sensor 210 includes an individual sensor 243 comprising a polarization filter layer 253. Similar to the filter layer 233, the polarization filter layer 253 is divided into three groups in a row-by-row, column-by-column, or checkerboard manner. A first polarization filter having a first polarization angle is located in the first group, a second polarization filter having a second polarization angle is located in the second group, and a third polarization filter having a third polarization angle is located in the third group.

The device 200 is configured to detect the aggregate state of the water on the surface 150.

The optical sensor 110 is configured to produce a first image 143 having a first bandwidth and a second image 146 having a second bandwidth.

The additional optical sensor 210 is configured to produce a third image 263 with a first polarization filter, a fourth image 266 with a second polarization filter, and a fifth image 269 with a third polarization filter.

The optical sensor 110 and the additional optical sensor 210 are configured to provide the first, second, third, fourth, and fifth images 143, 146, 263, 266, 269 to the processor 120.

The optional temperature sensor 230 is configured to provide an ambient temperature value to the processor. If the ambient temperature is well above or well below the freezing point of water, the region comprising water will be identified as being water or ice, depending on the ambient temperature.

The processor 120 is configured to evaluate an absorption measurement on the basis of the first and second images 280 and to detect the water on the surface 150. Furthermore, the processor 120 is configured to evaluate a backscattering measurement while using the third, fourth, and fifth images 290 and to detect an aggregate state of the water in the regions comprising water. The evaluation method 280 of an absorption measurement and properties of the evaluation method 290 of a backscattering measurement will be further explained below.

The detected aggregate states 240 of the regions comprising water are the outputs of the processor or the outputs of the device.

Figure 3A:
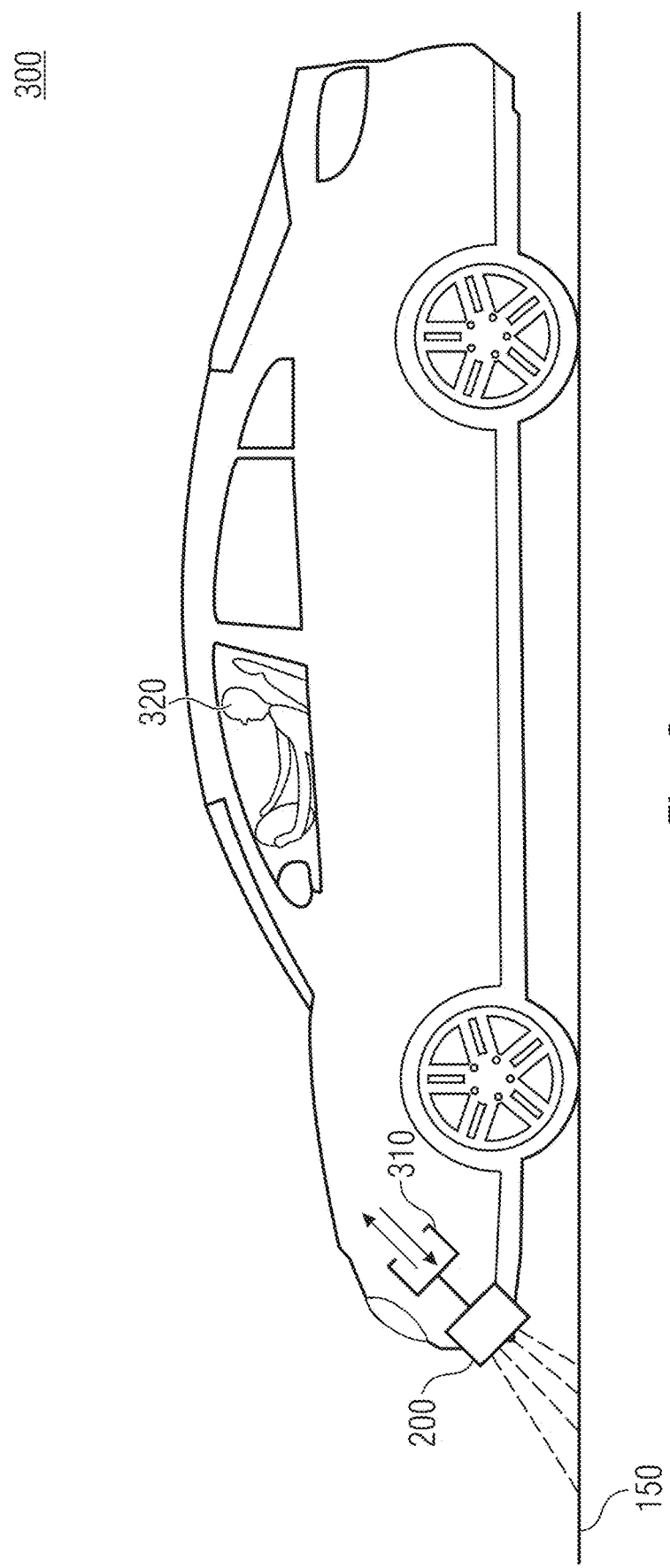
FIG. 3a shows a schematic representation of an embodiment of a means of locomotion comprising the device and an interface.

FIG. 3a shows a schematic representation of an embodiment of a means of locomotion 300 having a device 200 and an interface 310 coupled to the device.

As was explained in FIG. 2, the device 200 is configured to detect an aggregate state in the regions comprising water on a surface 150.

The interface 310 is configured to alert a driver 320 of the means of locomotion and/or to preemptively influence control of the means of locomotion if the device detects a solid state of the water.

The device 200 of the means of locomotion 300 enables safe driving by preemptively identifying and locating wet areas, puddles, and ice or snow formations on the road and classifying the aggregate state when the ambient temperature is near the freezing point of water. Inference of an actual hazard or risk of traction loss is a key feature for future advanced driver assistance systems (ADAS) or autonomous driving vehicles.

Alternatively, FIG. 3b shows a schematic representation of a second embodiment of a means of locomotion 300 comprising a device 200. The device 200 comprising an image sensor at a camera height of 1.40 m may look ahead as far as between 5 m and 100 m. For example, if a device wants to look ahead 100 m, the incident angle 330 will be approx. ~1°.

Figure 4A:
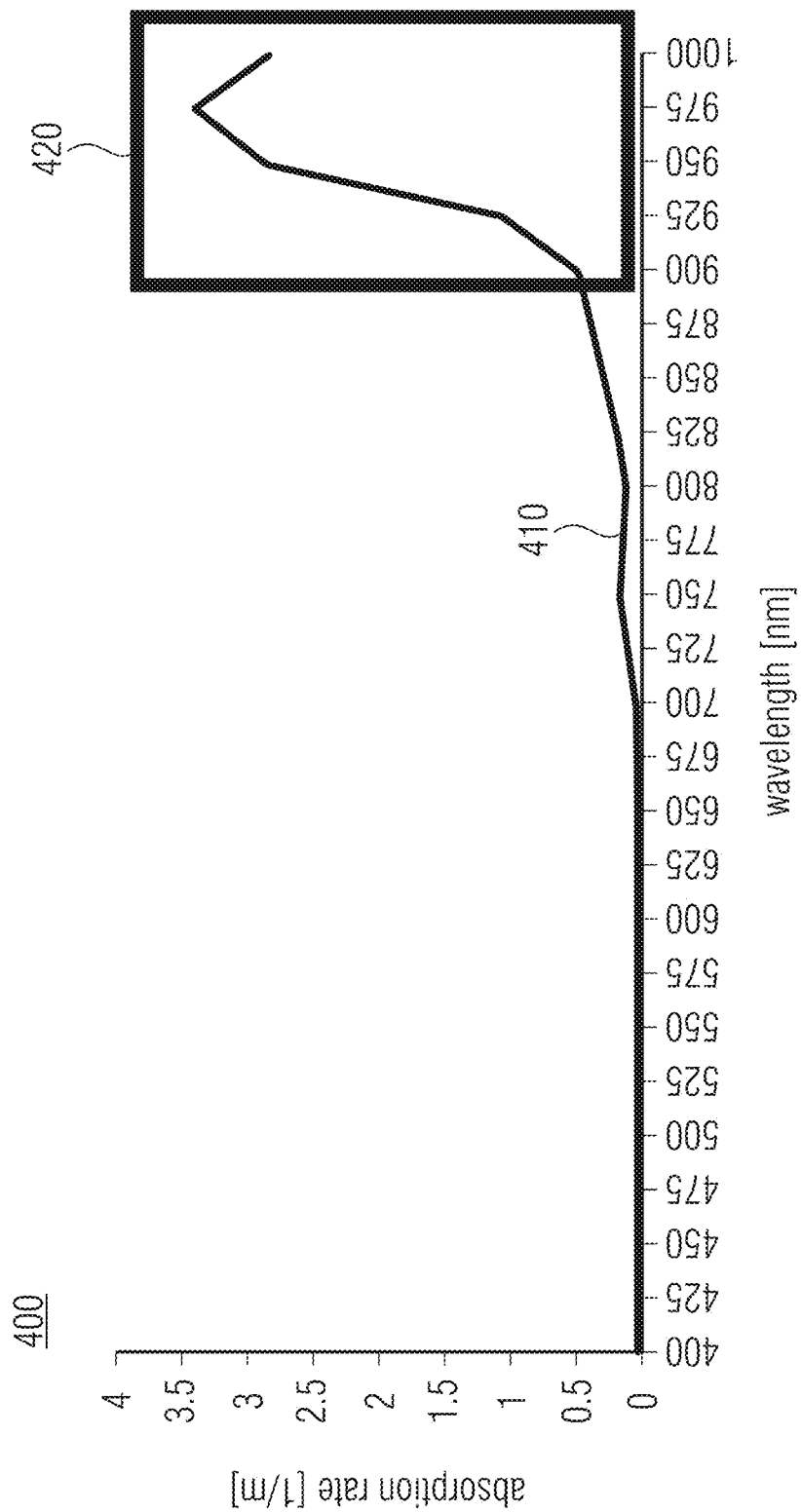
FIG. 4a shows a diagram of an absorption characteristic of water within the spectral range between 400 nm and 1000 nm.

FIG. 4a shows a diagram 400 of the absorption characteristics 410 of water within the spectral range between 400 nm and 1000 nm. The spectral range between 900 nm and 1000 nm has a high absorption rate and is highlighted by a window 420.

Figure 4B:
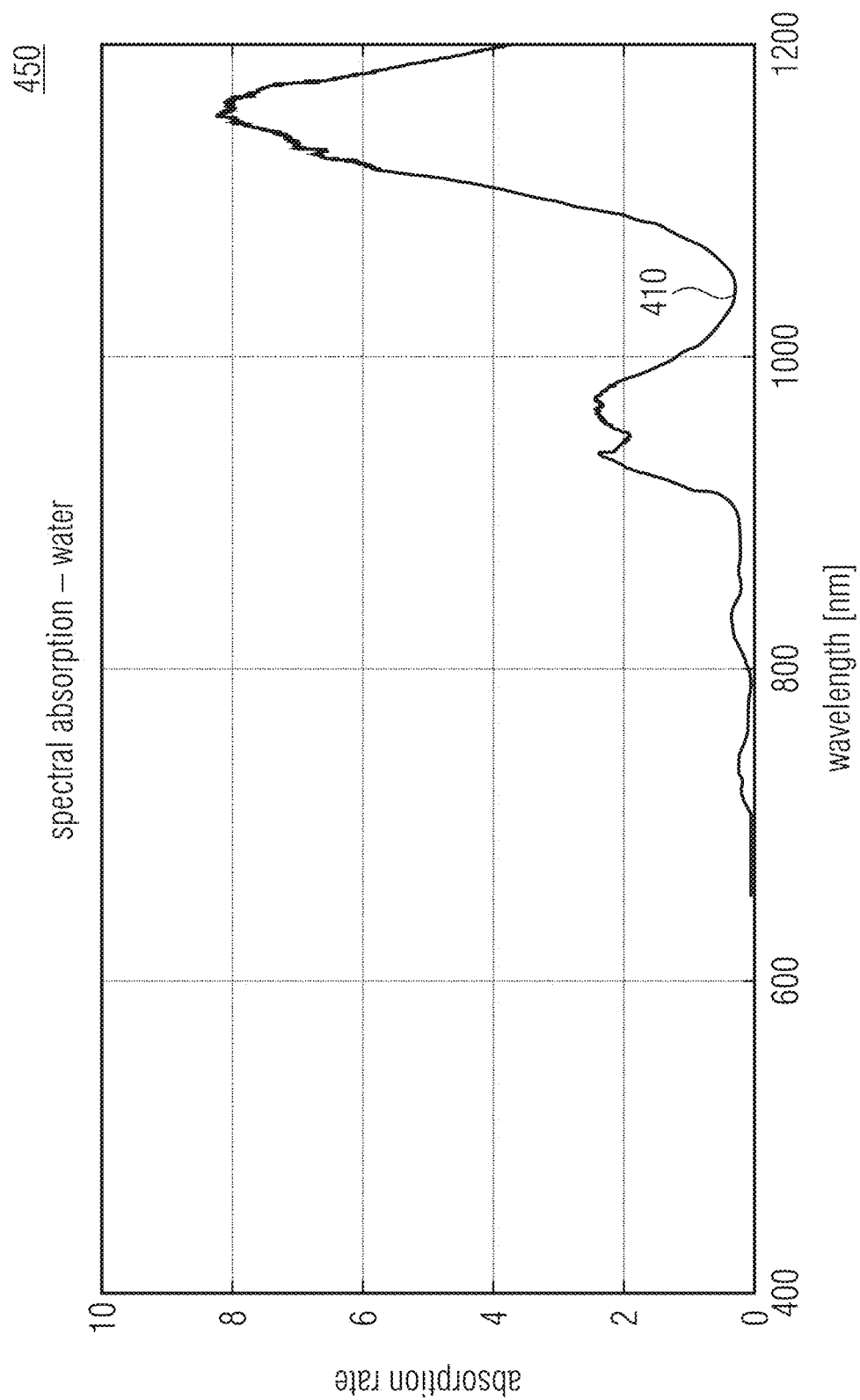
FIG. 4b shows a diagram of an absorption characteristic of water within the spectral range between 400 nm and 1200 nm.

FIG. 4b shows a diagram 450 of an absorption characteristic 410 of water within the spectral range between 400 nm and 1200 nm. The spectral range between 900 nm and 1200 nm has two absorption peaks. The device 200 is sensitive within the wavelength range between 900 and 1000 nm. Specific III-V semiconductor image sensors sensitive in higher wavelength ranges >1100 nm are not necessary.

As was explained in FIG. 1, the device 100 exploits the absorption characteristics of water. The optical sensor 110 of the device 100 takes two pictures 143, 146 over the same surface 150 by means of bandpass filters 133, 136 for spectral ranges with high and low water absorption rates, respectively. Regions comprising water in the first image 143 and the second image 146 are imaged differently.

Since other environmental materials such as asphalt, for example, exhibit a consistent absorption rate within the spectral range between 400 nm and 1200 nm, external influencing factors such as changing background or illumination, for example, will affect both pictures equally.

To reduce or eliminate the background, or to highlight the regions comprising water, the processor 120 of the device 100 is configured to combine the pictures 143, 146 with each other. By optimally selecting the first optical bandwidth of the first optical bandpass filter 133 and the second optical bandwidth of the second optical bandpass filter 136, a maximally possible difference in pixel intensities in the regions comprising water between the pictures is provided.

The absorption peak of water is at about 980 nm, so a first bandpass filter is used within the wavelength range between 900 and 1000 nm. The second bandpass filter is actually freely selectable within the wavelength range between 400 and 900 nm.

In an optimum selection, the first optical bandwidth may have a value ranging between 820 nm and 870 nm, 840 nm and 880 nm, or 850 nm and 890 nm, for example, at a half-width, and the second optical bandwidth may have a value ranging between 920 nm and 970 nm, 940 nm and 980 nm, or 950 nm and 990 nm, for example, at the half-width.

FIG. 5 shows a schematic representation of an evaluation method 280 of the absorption measurement performed by the processor 120 of the device 200 in FIG. 2.

As a starting point, a surface 510 is shown which is partially covered with water 520, such as a road with a puddle.

As a first step, the optical sensor 110 of the device 200 produces a first image 143 having a first optical bandwidth within which the water 520 has a first absorption rate, and a second image 146 having a second optical bandwidth within which the water has a second absorption rate that is higher than the first absorption rate.

Because of the different absorption rates, regions comprising water 520 are imaged differently in the first image 143 and the second image 146. In the second image 146, regions comprising water 520 are considerably darker.

As a second step, the processor 120 of the device 200 produces a combined image 530 from the first image 143 and from the second image 146. In this case, pixel-by-pixel quotient calculation is used in pixel-by-pixel combining. Other methods of combining may include pixel-by-pixel difference calculation, pixel-by-pixel normalized difference calculation, or difference calculation between 1 and quotient calculation.

The combined image or the result of the pixel-by-pixel quotient calculation is a kind of heat map, so the more a quotient value deviates from 1.0, the more likely it will be that water or ice there will be detected there.

As a third step, the processor 120 of the device 200 detects or locates regions comprising water. Locating or detecting the regions comprising water may be performed as a final decision with a threshold on a pixel-by-pixel basis or via "feature extraction," i.e., identification of contiguous areas. The detected regions comprising water 140 are the outputs of the evaluation method 280 of the device 200.

It should be noted here that a water absorption rate is about $$2.0 \cdot 10^{-3} \frac{1}{\text{mm}}.$$

That is, a 1 mm deep film of water with a pixel saturation of 255, absorption will be only $2.0 \cdot 10^{-3} \cdot 255 = 0.51$ at best.

For the absorption effect to be measurable at all, the adjacent pixels are also incorporated in a pixel window. The larger the pixel window, the more the absorption effect will be amplified and, accordingly, the blurrier the resulting folded image or water heat map will be. For example, if a puddle consists of only a single pixel or too few pixels, it will not be identified.

Furthermore, the difference between a simple difference calculation and a simple quotient calculation will be explained in more detail in the following example.

As a starting point, a surface having light and dark areas is selected which is covered by a water film. Within a spectral range within which water absorbs negligibly little, a measured value of e.g. 200 is obtained for the light area and e.g. 50 for the dark area. Within the spectral range within which water absorbs to a noticeable extent, one gets readings of, e.g., $0.8 \cdot 200 = 160$ for the light area and $0.8 \cdot 50 = 40$ for the dark area.

The difference would now be 40 for the light area and 10 for the dark area, which would lead to the wrong conclusion that there is more water present on the light area.

However, the quotient results in the value of 0.8 for both areas. A dry area corresponds to the value of 1.0 in the case of a quotient calculation.

For example, pixel-by-pixel normalization of the difference would also be possible, e.g.

$$\frac{i_1(x, y) - i_2(x, y)}{i_1(x, y)} = 1 - \frac{i_2(x, y)}{i_1(x, y)},$$

which would then simply be 1−the quotient. The values $i_1(x,y)$ and $i_2(x,y)$ represent individual pixel intensity values of the first and the second images at the position x, y.

Figure 6B:
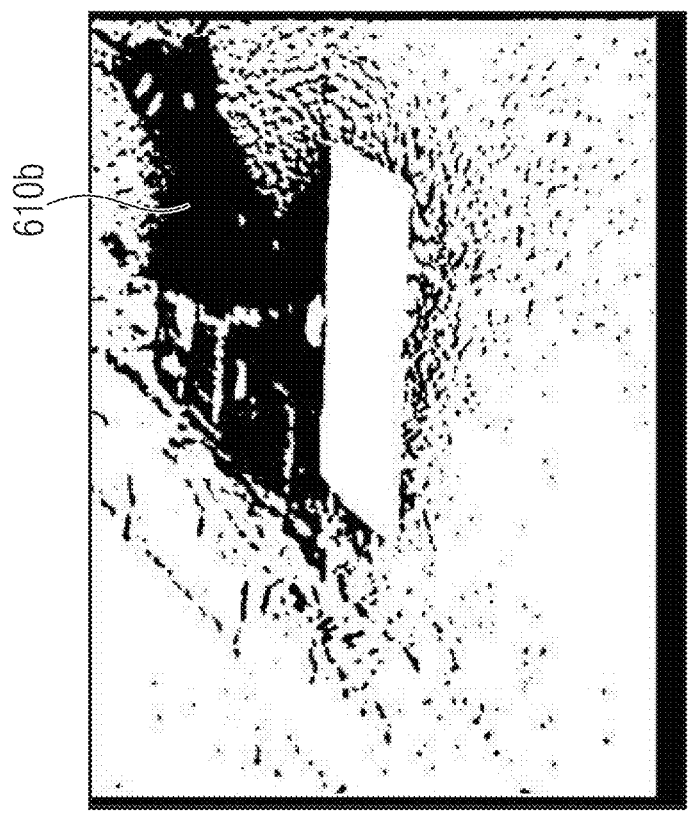
FIG. 6b shows a combined image over a surface comprising water.
Figure 6A:
FIG. 6a shows an image without a filter over a surface comprising water.

FIG. 6 shows an exemplary scenario for the absorption measurement performed by a device 100. FIG. 6a shows the original surface, i.e., a picture without a filter, with a region comprising water 610a.

FIG. 6b shows a combined image or a folded image. The combined image was produced by pixel-by-pixel quotient calculation between a first image 143 with a spectral range between 900 nm and 1000 nm and a second image 146 with a spectral range between 800 nm and 900 nm. To be able to produce a reduced picture, the pixels are averaged through a 5×5 pixel window.

In the example, the following bandpass filters were used:

850 nm CWL, 50 nm FWHM bandpass filter with a 400-2200 nm vertical polarization filter with a contrast of 400:1, and 950 nm CWL, 50 nm FWHM bandpass filter with a 400-2200 nm vertical polarization filter with a contrast of 400:1.

The combined image was evaluated with a simple threshold. The threshold decision may be defined while using, for example, the following function:

$$\max(\text{round}(i(x,y) - 0.4), 1.0)$$

Dry regions or regions of milky ice are light or white in the picture and have a value greater than 0.9. Values less than 0.9 are dark or black in the picture and are identified as water. Absorption of clear/wet ice behaves like water.

Light may not penetrate milky ice or snow, so milky ice or snow has no effect on the absorption rate.

Regions comprising water 610b in the combined image are clearly visible. Furthermore, reflections of trees on the water surface hardly have an effect on the absorption measurement. The combined image corrects the measurements for changing external influences such as subsurface material, lighting, or a changing environment reflected in the water body.

Clear ice behaves like water.

This absorption measurement method is configured to cope with unknown light sources. The only requirement is that the light source has enough energy within the near infrared (NIR) range, i.e. below 1000 nm. In sunlight, there is no problem at all, and at night, car headlights such as halogen lamps, for example, are sufficient.

The absorption peak of water is around 980 nm, so a first bandpass filter is used within the wavelength range between 900 and 1000 nm.

The second bandpass filter is actually freely selectable within the wavelength range between 400 and 900 nm. In embodiments, the second bandpass filter is within the wavelength range between 800 and 900 nm.

Thus, simply put, two colors are compared. However, the optical bandpass filters 133, 136 that are used are not within the visible range. The optical sensors 110 used, e.g. CMOS sensors, have no Bayer filter coating and are thus monochrome. The three colors red, green, blue (R-G-B) are nothing but bandpass filters, within the wavelength ranges ~600-700 nm, ~500-600 nm, ~400-500 nm.

FIG. 7 shows the reflection characteristics of water 760 detected by a device 100. All forms of water exhibit significant specular reflection, which causes a polarization effect.

Figure 7A:
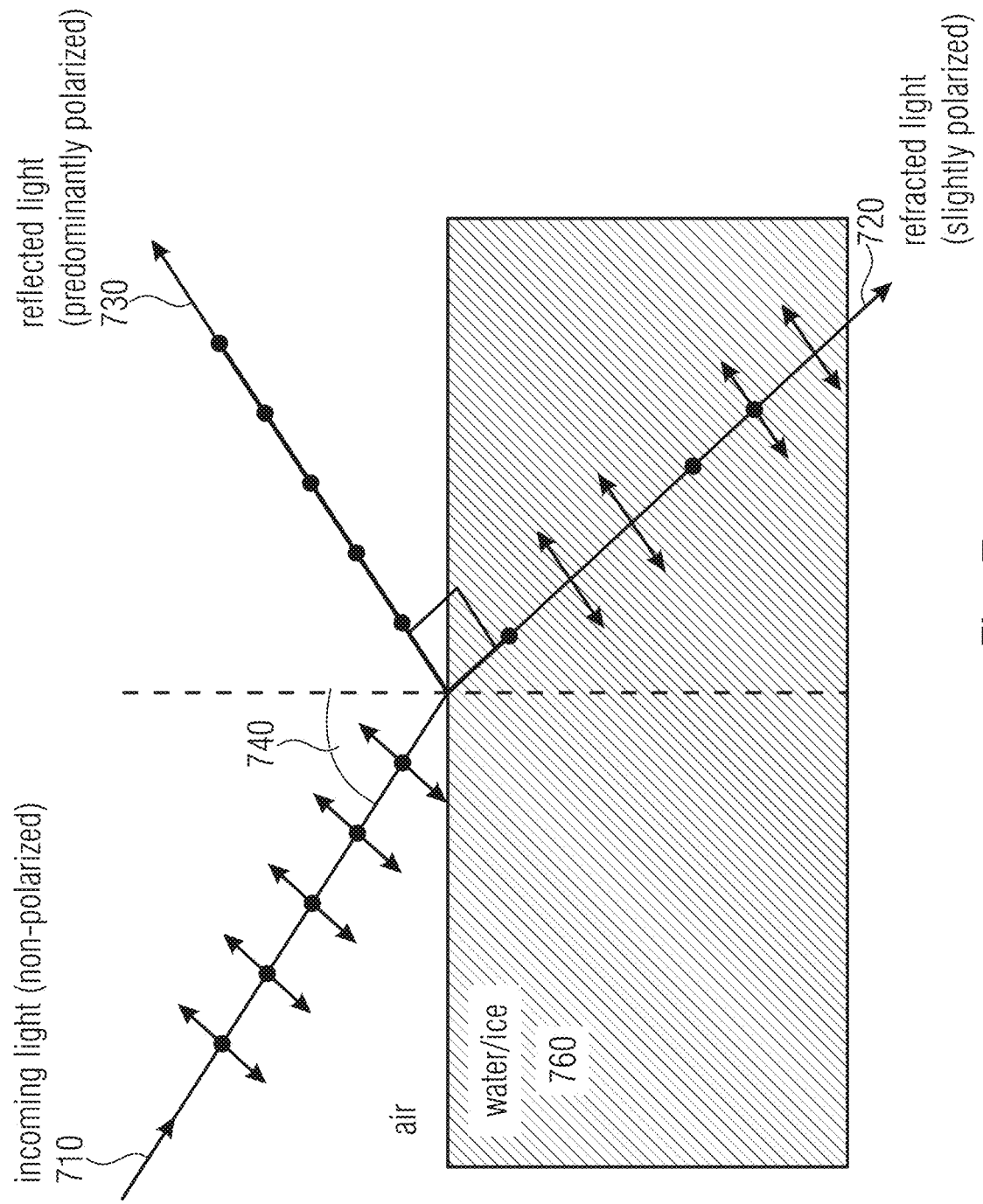
FIG. 7a shows non-polarized light rays partially penetrating the water and partially being reflected off the water surface.

FIG. 7a shows non-polarized light rays 710 partially penetrating water 760 and partially being reflected off the water surface.

Figure 7B:
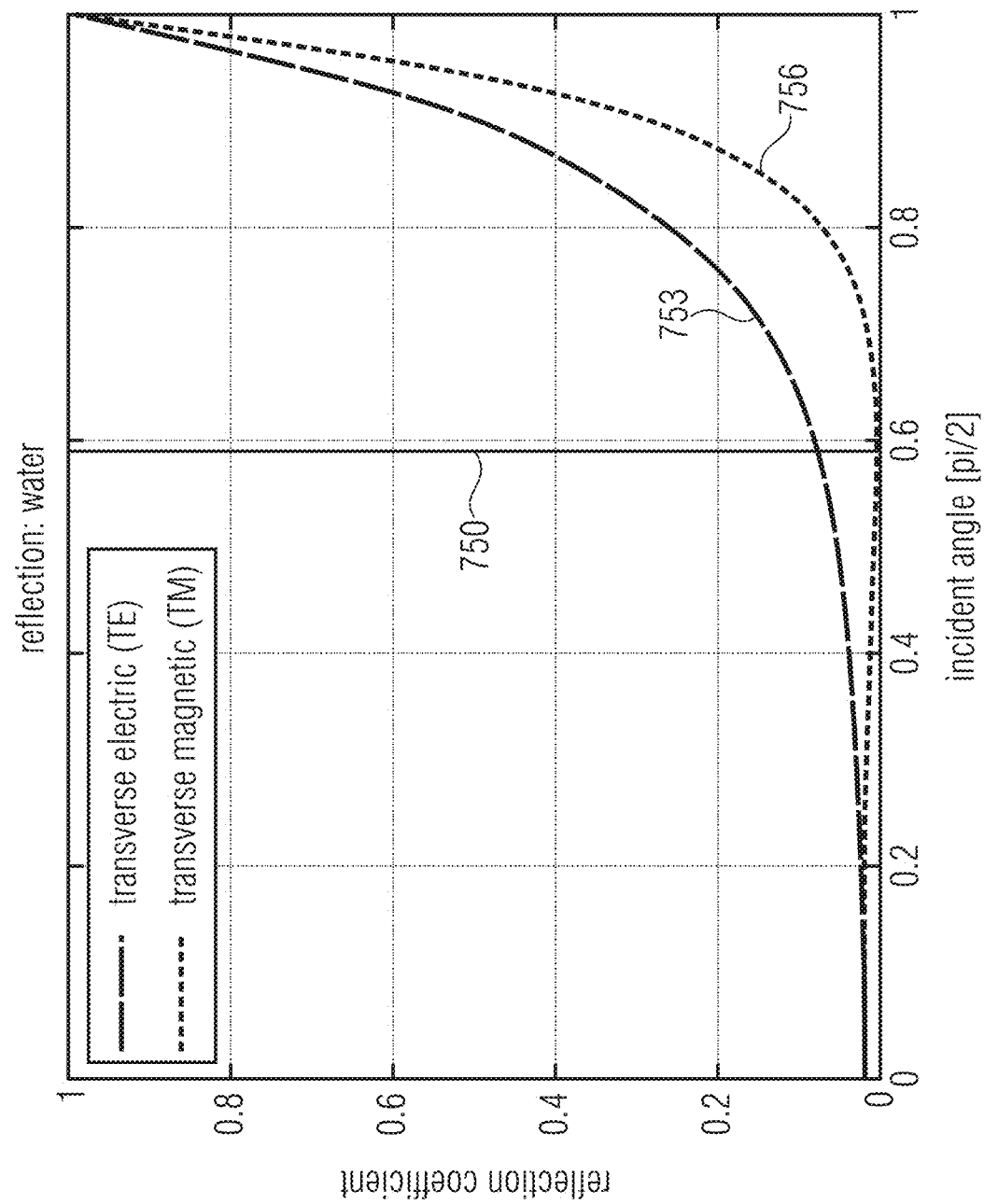
FIG. 7b shows a diagram of the reflection coefficients of the light rays polarized perpendicularly and in parallel at different incident angles.

FIG. 7b shows a diagram of the reflection coefficients of the light rays that are polarized perpendicularly (TE) 753 and in parallel (TM) 756 and that are reflected off the water surface, at different incident angles 740. The incident angle perpendicular to the water surface has a value of 0°. Furthermore, the Brewster angle 750, approx. 53° for water, is also marked in FIG. 7b. With the Brewster angle 750, the reflected rays are 100% horizontally polarized. As long as the incident angle 740 of the reflected ray is close to the Brewster angle 750, the reflected ray 730 will be 100% horizontally polarized.

Figure 7C:
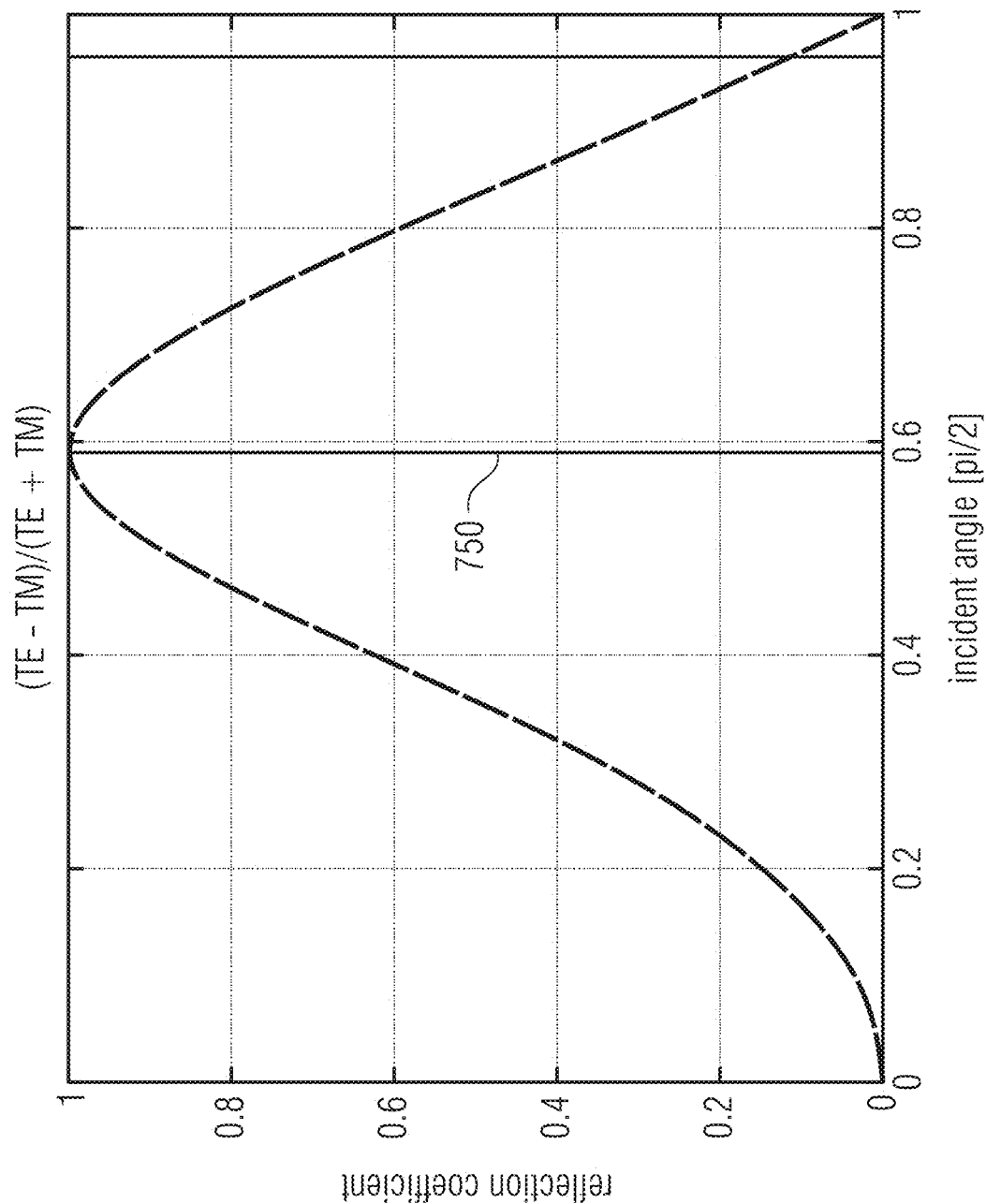
FIG. 7c shows a diagram of the reflection coefficient rate $$\frac{TE - TM}{TE + TM}$$

FIG. 7c shows a diagram of the reflection coefficient rate $$\frac{TE - TM}{TE + TM}$$

of the light rays that are polarized vertically and in parallel and are reflected off the water surface, at different incidence angles 740. The polarization rate has a maximum value at the Brewster angle 750, i.e., at about ~53°.

In FIG. 7a, the light rays 730 reflected off the water surface are mainly horizontally polarized, and the penetrating light rays 720 are mainly vertically polarized.

Only the penetrating light rays 720 are affected by the absorption of the water. The horizontally polarized rays 730 that are reflected in a specular manner are not relevant to, or even interfere with, absorption measurement. Reduction or elimination of the horizontally polarized rays 730 that are reflected in a specular manner is possible with a vertical polarization filter, such as the vertical polarization filter 115 in FIG. 1.

As is shown in FIG. 7b, the vertical polarization filter remains advantageous as long as the incident angle 740 of the reflected ray is close to the Brewster angle 750, since here the reflected ray 730 is 100% horizontally polarized. The further the incident angle is from the Brewster angle, the less effect the polarization filter will have.

If an image sensor of a means of locomotion, e.g. the means of locomotion 300 in FIG. 3, wants to look 100 m ahead at a camera height of 1.40 m, the incident angle will be about ~89°.

In the following, the backscattering measurement will be explained. The evaluation 290 of the backscattering measurement is performed by the processor 120 of the device 200 while using the third, fourth, and fifth images, the three images differing from one another with regard to their polarization planes.

The polarization angles of the images may be represented as a polarization ellipse. FIG. 8a shows that the polarization ellipse cannot be determined unambiguously on the basis of two polarization planes 810, 820 since there are typically three possible solutions 830, 840, 850. With the help of two polarization planes, it is still possible to train a model that achieves a probable result.

FIG. 8b shows three polarization planes 860, 870, 880 defining a polarization ellipse 890. The three polarization planes 860, 870, 880 are evenly distributed, and the angular offset of the polarization planes is not relevant here.

FIGS. 8c and 8d show an evaluation 290 or classification of the backscatter characteristic performed by the processor 120 of the device 200 in FIG. 2. In an evaluation 290 of the backscattering characteristic, the relationship between the major and minor axes of a polarization ellipse is important. Here, two polarization filters, 0° and 90°, are sufficient in most cases. The third filter allows increased accuracy. The inclination of the ellipse depends strongly on the ambient light and is therefore difficult to use.

As was explained in FIG. 7a, the rays reflected off the water surface are mainly horizontally polarized. FIG. 8c shows a polarization ellipse of liquid water with a large horizontally polarized proportion.

Ice crystals scatter the light ray and rotate the polarization ellipse. The result is a more scattered polarization with a slightly shifted orientation. FIG. 8d shows a polarization ellipse of solid water with uniform polarization components.

The rotation of the polarization ellipse depends on the illumination. With homogeneous illumination, the rotation of the polarization ellipse is also homogeneous and may be used as a feature.

FIG. 8f shows that with homogeneous illumination, ice crystals scatter the light ray and rotate the polarization ellipse. Meanwhile, FIG. 8e shows a polarization ellipse of water without any change in orientation.

FIG. 9 shows a scenario exemplary for the backscattering measurement with three exemplary representations and one raw picture. FIG. 9d shows the original surface, i.e., a picture without a filter. FIG. 9d shows a road surface with a dry area 920, a region comprising water 910, and two icy surfaces 930.

FIGS. 9a, 9b, 9c show the third, fourth, and fifth images, respectively, the three images differing from one another with regard to their polarization planes. FIGS. 9a-c are false-color representations. Here, the pictures from the polarization filters are placed on R (+60°), G (0°), B (−60°) to make the effect more vivid. Here, white (R~G~B) is ice, green (R<G>B) is water, and purple (R>G<B) is dry.

The following polarization filters were used in the example:
  400-2200 nm polarization filter with a contrast of 400:1 at 0° (horizontal).
  400-2200 nm polarization filter with a contrast of 400:1 at 60°.
  400-2200 nm polarization filter with a contrast of 400:1 at 120°.

The backscattering measurement is independent of the absorption measurement. Here, the three pictures taken are normalized to the average of the three pictures on a pixel-by-pixel basis and compared with one another. In normalization, the following equation is used:

$$p_{1N} = \frac{p_1}{p_1 + p_2 + p_3},$$

where $p_{1N}$ represents a normalized pixel of the first image, and $p_1$, $p_2$ and $p_3$ represent individual picture-element values of the third, fourth and fifth images.

A simple threshold decision in this case would be, for example: if $p_0 << p_{60}$ and $p_0 << p_{120}$, then water, or if $p_0 \sim = p_{60} \sim = p_{120}$, then milky ice/snow, or if $p_0 > p_{60} \sim = p_{120}$, then clear ice. The values $p_0$, $p_{60}$ and $p_{120}$ represent individual picture-element values of the third, fourth, and fifth images.

In the first approaches, heat maps of the individual methods are simply combined. The backscattering method measures surface scattering and would interpret any smooth object as water. The absorption method would ignore this.

What is at hand is liquid water only if the absorption rate is high and the backscattering measurement ascertains little scattering or a smooth surface.

In the case of clear ice, the logic is different. What is at hand is clear ice when the absorption rate is high, i.e. water is present, while the backscattering measurement shows high scattering.

Turbid ice/snow is poorly detected by absorption but is all the more easily detected by backscattering, since it exhibits no absorption but very high scattering.

The absorption method may be improved by using algorithms to assess neighboring pixels and trained decision models for taking into account all of the surroundings. To cover the different cases, a model is trained by means of machine learning here. For image sections of a size of 32×32 pixels, the recognition rate was at 98%, and was still at a very good 85% when cross-validated with field test data. When using a neural network that also evaluates the shape, and when performing training with field test data, more than 95% will again be achieved.

FIG. 10 shows a schematic representation of an embodiment of an optical sensor 1000 comprising an image sensor 1020 comprising a filter layer 1010. The filter layer 1010 is located above the image sensor 1020. The image sensor is divided into pixels 1030.

The filter layer is evenly divided into four different filter groups, F1, F2, F3, F4 on a pixel-by-pixel basis. For example, filter groups F1 and F2 may include a bandpass filter, and filter groups F3 and F4 may include a polarization filter, Light rays 1040 will arrive at the filter layer 1010. Pixels 1030 of image sensor 1020 will receive filtered light rays from different filter groups F1, F2, F3, F4 of the filter layer 1010. The image produced by the individual sensor is divided into four pictures 1060, 1070, 1080, 1090 by filter groups F1, F2, F3, F4, and the images are provided to the processor.

The optical sensor 1000 may replace the sensors 110 and 210 in the device 200.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device). In some embodiments, some or several of the most important method steps may be performed by such a device.

FIG. 11 shows an implementation involving three different cameras, or light-sensitive areas. A first camera 1101, a second camera 1102, and a third camera 1103 are arranged next to one another to sense the same light illustrated by $X_i$. The first camera 1101 has two filter layers 1101a and 1101b. The second camera 1102 has two filter layers 1102a and 1102b, and the third camera 1103 has two filter layers 1103a and 1103b. The filters or filter layers 1101a and 1103a are identical and filter with regard to a first wavelength $\lambda_1$. The filter layer 1102a or the filter 1102a filters with regard to a different wavelength $\lambda_2$. Moreover, the filters or filter layers 1101b, 1102b, and 1103b are polarization filters, the elements 1101b and 1102b of which are identical and filter with regard to a first polarization $\phi1$, whereas the element 1103b filters with regard to a second polarization $\phi2$. The result of each camera and/or light-sensitive area 1101, 1102, 1103 is depicted at 1104. Three images have been produced which each comprise a different combination of polarization ($\phi1$, $\phi2$) and absorption ($\lambda_1$ and $\lambda_2$).

For the evaluation method, $\Delta X\phi$ and $\Delta X\lambda$ may be used as are present in brackets on the left side of the block of equations 1105. In the 4-camera/filter system, the sizes are directly obtained. In the present 3-camera system shown in FIG. 11, the sizes are additionally attenuated by the further filter, as shown on the left side in the block of equations 1105, since the sizes $\Delta X\phi$ and $\Delta X\lambda$ are attenuated by the first absorption filter depicted by $\lambda_1(\ )$, and/or by the first polarization filter depicted by $\phi_1(\ )$. However, since these two filters $\lambda_1(\ )$ and $\phi_1(\ )$ are known, the expressions on the left side of the equations 1105 are calculated back to the original responses $\Delta X\phi$ and $\Delta X\lambda$.

It shall be noted that it is not relevant whether or not the arrangement comprises three dedicated cameras or one chip having 3 areas (pixels) and/or three areas 1102, 1102, 1103 per pixel.

In the advantageous embodiment in FIG. 11, the following are used:
$\phi1=0°$ (horizontally polarized)
$\phi2=90°$ (vertically polarized)
$\lambda1=850$ nm (bandpass 50 nm FWHM)
$\lambda2=950$ nm (bandpass 50 nm FWHM)

The advantageous device thus includes the optical sensor having the light-sensitive area (1101, 1102, 1103) for producing the first image ($X_{01}$) of the surface which has the first optical bandwidth ($\lambda_1$), and the second image ($X_{02}$) of the surface which has the second optical bandwidth ($\lambda_2$). Moreover, the additional optical sensor is configured to provide the third image ($X_{01}$) having the first polarization filter, and to provide the fourth image ($X_{03}$) having the second polarization filter to the processor. In addition, the processor is configured to determine a difference ($X_{01}-X_{02}$) from the first image and the second image, and to calculate the combined image while using the first polarization filter. Furthermore, the processor is configured to determine a further difference ($X_{01}-X_{03}$) from the third image and the fourth image, and to calculate a polarization difference ($\Delta X\lambda$) while using the first absorption filter so as to use the polarization difference ($\Delta X\lambda$) for evaluating the regions comprising water.

The first image mentioned for the purpose of this application is, in the case of the 3-camera/element solution described, the same image as the third image. However, the second image and the fourth image are different images of different light-sensitive areas 1102 and 1103. In addition, it shall be noted that the combined image thus cannot necessarily be obtained by a simple difference but may be obtained by processing a difference, possibly while using a filter as in the embodiment of FIG. 11.

Depending on particular implementation requirements, embodiments of the invention may be implemented in hardware or in software. The implementation may be performed using a digital storage medium, for example, a floppy disk, a DVD, a Blu-ray disc, a CD, a ROM, a PROM, an EPROM, an EEPROM, or a FLASH memory, a hard disk, or any other magnetic or optical storage medium on which electronically readable control signals are stored, which may interact, or actually do interact, with a programmable computer system in such a way as to perform the respective method. Therefore, the digital storage medium may be computer readable.

Thus, some embodiments according to the invention include a storage medium having electronically readable control signals capable of interacting with a programmable computer system such that any of the methods described herein are performed.

Generally, embodiments of the present invention may be implemented as a computer program product having program code, the program code being operative to perform any of the methods when the computer program product is running on a computer.

For example, the program code may also be stored on a machine-readable medium.

Other embodiments include the computer program for performing any of the methods described herein, wherein the computer program is stored on a machine-readable medium.

In other words, an embodiment of the method of the invention is thus a computer program comprising program code for performing any of the methods described herein when the computer program runs on a computer.

Thus, another embodiment of the methods according to the invention is a data carrier (or a digital storage medium or a computer-readable medium) on which the computer program for performing any of the methods described herein is recorded.

Thus, another embodiment of the method of the invention is a data stream or sequence of signals representing the computer program for performing any of the methods described herein. The data stream or sequence of signals may, for example, be configured to be transferred over a data communication link, such as over the Internet.

Another embodiment comprises a processing device, such as a computer or programmable logic device, configured or adapted to perform any of the methods described herein.

A further embodiment comprises a computer having installed thereon the computer program for performing any of the methods described herein.

Another embodiment according to the invention comprises a device or system configured to transmit a computer program for performing at least one of the methods described herein to a receiver. The transmission may be, for example, electronic or optical. The receiver may be, for example, a computer, mobile device, storage device, or similar device. The device or system may include, for example, a file server for transmitting the computer program to the receiver.

In some embodiments, a programmable logic device (for example, a field programmable gate array, an FPGA) may be used to perform some or all of the functionalities of the methods described herein. In some embodiments, a field programmable gate array may interact with a microprocessor to perform any of the methods described herein. In general, in some embodiments, the methods are performed on the part of any hardware device. This may be general-purpose hardware, such as a computer processor (CPU), or hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LITERATURE

A. L. Rankin, L. H. Matthies, and P. Bellutta (2011), "Daytime water-detection based on sky reflections", in Robotics and Automation (ICRA 2011 IEEE International Conference on. IEEE, 2011, pp. 5329-5336

C. V. Nguyen, M. Milford, R. Mahony (2017): "3[) tracking of water hazards with polarized stereo cameras", 2017 IEEE International Conference on Robotics and Automaton (ICRA) Singapore, May 29-Jun. 3, 2017

V. Vikari, T. Varpula, and M. Kantanen (2009), "Road-condition recognition using 24-GHz automotive radar", IEEE Transactions on Intelligent Transportation Systems, vol. 10, no. 4, pp. 639-648, 2009

J. Casselgren, S. Rosendahl, M. Sjòdahl, P. Jonsson (2015), "Road condition analysis using NIR illumination and compensating for surrounding light", in Optics and Lasers in Engineering 77(2016) pp 175-182

A near-infrared optoelectronic approach to detection of road conditions L. Colace, F. Santoni, G. Assanto, NooEL-Nonlinear Optics and OptoElectronics Lab, University "Roma Tre", Via della Vasca Navale 84, 00146 Rome, Italy 3D tracking of water hazards with polarized stereo cameras Chuong V. Nguyen1, Michael Milford2 and Robert Mahony A Lane Detection Vision Module for Driver Assistance A. L. Rankin, L. H. Matthies, and P. Bellutta (2011), "Daytime water-detection based on sky reflections", in Robotics and Automation (ICRA 2011 IEEE International Conference on. IEEE, 2011, pp. 5329-5336

C. V. Nguyen, M. Milford, R. Mahony (2017): "3[) tracking of water hazards with polarized stereo cameras", 2017 IEEE International Conference on Robotics and Automaton (ICRA) Singapore, May 29-Jun. 3, 2017

V. Vikari, T. Varpula, and M. Kantanen (2009), "Road-condition recognition using 24-GHz automotive radar", IEEE Transactions on Intelligent Transportation Systems, vol. 10, no. 4, pp. 639-648, 2009

J. Casselgren, S. Rosendahl, M. Sjòdahl, P. Jonsson (2015), "Road condition analysis using NIR illumination and compensating for surrounding light", in Optics and Lasers in Engineering 77(2016) pp 175-182

A near-infrared optoelectronic approach to detection of road conditions L. Colace, F. Santoni, G. Assanto, NooEL-Nonlinear Optics and OptoElectronics Lab, University "Roma Tre", Via della Vasca Navale 84, 00146 Rome, Italy 3D tracking of water hazards with polarized stereo cameras Chuong V. Nguyen1, Michael Milford2 and Robert Mahony A Lane Detection Vision Module for Driver Assistance Author(s): Maček, Kristijan; Williams, Brian; Kolski, Sascha; Siegwart, Roland Daytime Water Detection Based on Color Variation Arturo Rankin and Larry Matthies Daytime Water Detection Based on Sky Reflections Arturo L. Rankin, Larry H. Matthies, and Paolo Bellutta Detecting water hazards for autonomous off-road navigation Larry Matthies*, Paolo Bellutta, Mike McHenry Ice detection on a road by analyzing tire to road friction ultrasonic noise D. Gailius, S. Jačėnas Ice formation detection on road surfaces using infrared thermometry Mats Riehm, Torbjörn Gustaysson, Jörgen Bogren, Per-Erik Jansson Wet Area and Puddle Detection for Advanced Driver Assistance Systems (ADAS) Using a Stereo Camera Jisu Kim, Jeonghyun Baek, Hyukdoo Choi, and Euntai Kim*

MULTISPECTRAL IMAGING OF ICE Dennis Gregoris, Simon Yu and Frank Teti

Near field ice detection using infrared based optical imaging technology Hazem Abdel-Moati, Jonathan Morris, Yousheng Zeng, Martin Wesley Corie II, Victor Garas Yanni New System for Detecting Road Ice Formation Amedeo Troiano, Eros Pasero, Member, IEEE, and Luca Mesin Selection of optimal combinations of band-pass filters for ice detection by hyperspectral imaging Shigeki Nakauchi, Ken Nishino, and Takuya Yamashita A Sensor for the Optical Detection of Dangerous Road Condition Armando Piccardi and Lorenzo Colace Polarization-Based Water Hazards Detection for Autonomous Off-road Navigation Bin Xie, Huadong Pan, Zhiyu Xiang, Jilin Liu Road condition analysis using NIR illumination and compensating for surrounding light Johan Casselgren, Sara-Rosendahl, MikaelSjödahl, PatrikJonsson Self-Supervised Segmentation of River Scenes Supreeth Achar, Bharath Sankaran, Stephen Nuske, Sebastian Scherer and Sanjiv Singh.

The invention claimed is:

1. A device for identifying water on a surface, comprising:
an optical sensor for producing a first image of the surface which exhibits a first optical bandwidth within which the water exhibits a first absorption rate, and a second image of the surface which exhibits a second optical bandwidth within which the water exhibits a second absorption rate that is higher than the first absorption rate;
a processor for combining the first image and the second image to produce a combined image in which the surface is reduced or eliminated as compared to the water, and for detecting the water in the combined image; and
an additional optical sensor configured to provide to the processor a third image with a first polarization filter comprising a first polarization angle, and to provide to the processor a fourth image with a second polarization filter comprising a second polarization angle, wherein the two polarization filters differ from each other with regard to their polarization angles, and
wherein the processor is configured to detect an aggregate state of the water while using the third image and the fourth image in the combined image.

2. The device as claimed in claim 1, wherein the first optical bandwidth comprises a waveband selected from a spectral range between 400 nm and 900 nm; and the second optical bandwidth comprises a waveband selected from a spectral range between 900 nm and 1200 nm.

3. The device as claimed in claim 1, wherein the first optical bandwidth at a full width at half maximum exhibits a value ranging between 820 nm and 870 nm; and the second optical bandwidth at the full width at half maximum exhibits a value ranging between 950 nm and 990 nm.

4. The device as claimed in claim 1, wherein the optical sensor comprises a vertical polarization filter configured to reduce or eliminate the horizontally polarized light rays.

5. The device as claimed in claim 1, wherein the optical sensor comprises a silicon-based image sensor, a monochrome sensor, or a CMOS sensor.

6. The device as claimed in claim 1, wherein the optical sensor comprises a first individual sensor comprising a first optical bandpass filter comprising the first bandwidth, and a second individual sensor comprising a second optical bandpass filter comprising the second bandwidth,
wherein the optical sensor is configured to simultaneously produce the first image by means of the first individual sensor and the second image by means of the second individual sensor simultaneously; or
wherein the optical sensor comprises a third individual sensor comprising exchangeable optical bandpass filters, the exchangeable optical bandpass filters comprising the first optical bandpass filter comprising the first bandwidth and the second optical bandpass filter comprising the second bandwidth, wherein the optical sensor is configured to produce, in succession, the first image by means of the third individual sensor comprising the first optical bandpass filter, and the second image by means of the third individual sensor comprising the second optical bandpass filter; or
wherein the optical sensor comprises a fourth individual sensor comprising a filter layer, wherein the filter layer is configured to divide pixels of the image produced by the fourth individual sensor into two groups in a row-wise, column-wise or checkerboard-wise manner, wherein the first optical bandpass filter comprising the first bandwidth is arranged above the pixels of the first group, so that the pixels of the first group produce the first image comprising the first optical bandwidth, and the second optical bandpass filter comprising the second bandwidth is arranged above the pixels of the second group, so that the pixels of the second group produce the second image comprising the second optical bandwidth.

7. The device as claimed in claim 1, wherein the processor is configured to use, in combining the first image and the second image, pixel-by-pixel quotient calculation, pixel-by-pixel difference calculation, pixel-by-pixel normalized difference calculation, or a difference between 1 and quotient calculation.

8. The device as claimed in claim 1, wherein the processor is configured to produce a convolved image,
wherein the processor is configured to scan the combined image with pixels on a pixel-by-pixel or block-by-block basis by using a pixel window, to compute a weighted average of the values of the pixels of the pixel window, and to produce a convolved image from the weighted averages, wherein positions of the weighted averages in the convolved image match positions of the pixel windows in the combined image.

9. The device as claimed in claim 1, wherein the processor is configured to compare values of individual pixels of the combined image or of a convolved image derived from the combined image with a threshold, wherein the pixels with values that exhibit a certain relation to the threshold are detected as being water, or to perform feature detection to detect water.

10. The device as claimed in claim 1, wherein the additional optical sensor comprises an individual sensor comprising a polarization filter layer, wherein the polarization filter layer is configured to divide picture elements of the image produced by the individual sensor into two groups in a row-by-row, column-by-column, or checkerboard manner, wherein the first polarization filter is arranged above the picture elements of the first group, so that the picture elements of the first group produce the third image with the first polarization angle, and the second polarization filter is arranged above the picture elements of the second group, so that the picture elements of the second group produce the fourth image with the second polarization angle.

11. The device as claimed in claim 1, wherein the optical sensor and the additional optical sensor are configured in an individual sensor comprising a filter layer, wherein the filter layer is configured to divide picture elements of the image produced by the individual sensor into four groups in a row-by-row, column-by-column, or checkerboard manner,
wherein the first optical bandpass filter comprising the first bandwidth is arranged above the pixels of the first group, so that the pixels of the first group produce the first image comprising the first optical bandwidth,
wherein the second optical bandpass filter comprising the second bandwidth is arranged above the pixels of the second group, so that the pixels of the second group produce the second image comprising the second optical bandwidth,
wherein the first polarization filter is arranged above the picture elements of the third group, so that the picture elements of the third group produce the third image with the first polarization angle, and wherein the second polarization filter is arranged above the picture elements of the fourth group, so that the picture elements of the fourth group produce the fourth image with the second polarization angle.

12. The device as claimed in claim 1, wherein the polarization angles of the polarization filters are arranged to be offset from one another by 90°.

13. The device as claimed in claim 1, wherein the processor is configured to detect regions comprising water in the combined image or in a convolved image derived from the combined image, to evaluate picture elements from the third and fourth images in the regions comprising water, and to detect an aggregate state of the water, whether the regions comprising water comprise liquid water or ice.

14. The device as claimed in claim 13, wherein the processor is configured to generate normalized intensity values of the third and fourth images when evaluating the picture elements of the third and fourth images, to use, in generating the normalized intensity values, a comparison of the values of the picture elements with a sum of the values of the picture elements of the third and fourth images, to detect the aggregate state of the water, the processor being configured to detect an aggregate state of the water as ice when the normalized intensity values of the third and fourth images are within a range comprising +/−10% of the mean value of the normalized intensity values of the third and fourth images, or to detect the aggregate state of the water as liquid water when a normalized intensity value from the normalized intensity values of the third and fourth images is greater than 1.5 times the mean value of the normalized intensity values of the third and fourth images.

15. The device as claimed in claim 1, comprising a temperature sensor configured to provide an ambient temperature value to the processor, by means of which the processor may evaluate an aggregate state of the water.

16. The device as claimed in claim 1, wherein the processor is configured to sense a set of state values comprising information from the first image and the second image, and to provide a variable threshold as a function of the set while using an artificial-intelligence element or a neural network, and to detect, while using the variable threshold, water in the combined image or an aggregate state of the water in the combined image.

17. The device as claimed in claim 1, wherein the processor is configured to sense a set of state values comprising information from the third image and from the fourth image, and to provide a variable threshold as a function of the set while using an artificial-intelligence element or a neural network, and to detect, while using the variable threshold, water in the combined image or an aggregate state of the water in the combined image.

18. The device as claimed in claim 1, wherein the optical sensor comprises the light-sensitive area for producing the first image of the surface which exhibits the first optical bandwidth, and the second image of the surface which exhibits the second optical bandwidth, wherein the additional optical sensor is configured to provide the third image with the first polarization filter, and to provide the fourth image with the second polarization filter, wherein the processor is configured to determine a difference from the first image and the second image, and to calculate the combined image while using the first polarization filter, and wherein the processor is configured to determine a further difference from the third image and the fourth image, and to calculate a polarization difference while using the first absorption filter so as to use the polarization difference for evaluating the regions comprising water.

19. Means of locomotion comprising:

the device for identifying water on a surface, said device comprising:

an optical sensor for producing a first image of the surface which exhibits a first optical bandwidth within which the water exhibits a first absorption rate, and a second image of the surface which exhibits a second optical bandwidth within which the water exhibits a second absorption rate that is higher than the first absorption rate;

a processor for combining the first image and the second image to produce a combined image in which the surface is reduced or eliminated as compared to the water, and for detecting the water in the combined image; and an additional optical sensor configured to provide to the processor a third image with a first polarization filter comprising a first polarization angle, and to provide to the processor a fourth image with a second polarization filter comprising a second polarization angle, wherein the two polarization filters differ from each other with regard to their polarization angles, and wherein the processor is configured to detect an aggregate state of the water while using the third image and the fourth image in the combined image, and an interface, wherein the interface is configured to alert a driver of the means of locomotion and/or to influence control of the means of locomotion if the device detects a solid state of the water.

20. A method of distinguishing a liquid or solid aggregate state of water in a region comprising water, the method comprising:

acquiring a first image of the surface which exhibits a first optical bandwidth within which the water exhibits a first absorption rate, acquiring a second image of the surface which exhibits a second optical bandwidth within which the water exhibits a second absorption rate that is higher than the first absorption rate, combining the first image and the second image to acquire a combined image in which the surface is reduced or eliminated as compared to the water, detecting the water in the combined image, acquiring a third image with a first polarization filter comprising a first polarization angle, acquiring a fourth image with a second polarization filter comprising a second polarization angle, wherein the two polarization filters differ from each other with regard to their polarization angles, evaluating the picture elements of the regions comprising water of the third and fourth images, and detecting the aggregate state of the water on the basis of the evaluation of the picture elements.

21. A non-transitory digital storage medium having a computer program stored thereon to perform the method of distinguishing a liquid or solid aggregate state of water in a region comprising water, the method comprising:
- acquiring a first image of the surface which exhibits a first optical bandwidth within which the water exhibits a first absorption rate, acquiring a second image of the surface which exhibits a second optical bandwidth within which the water exhibits a second absorption rate that is higher than the first absorption rate,
- combining the first image and the second image to acquire a combined image in which the surface is reduced or eliminated as compared to the water,
- detecting the water in the combined image,
- acquiring a third image with a first polarization filter comprising a first polarization angle, acquiring a fourth image with a second polarization filter comprising a second polarization angle, wherein the two polarization filters differ from each other with regard to their polarization angles,
- evaluating the picture elements of the regions comprising water of the third and fourth images, and
- detecting the aggregate state of the water on the basis of the evaluation of the picture elements,
- when said computer program is run by a computer.

* * * * *